US011917623B2

(12) United States Patent
Terry et al.

(10) Patent No.: US 11,917,623 B2
(45) Date of Patent: *Feb. 27, 2024

(54) METHOD AND APPARATUS FOR PROVIDING AND UTILIZING A NON-CONTENTION BASED CHANNEL IN A WIRELESS COMMUNICATION SYSTEM

(71) Applicant: InterDigital Technology Corporation, Wilmington, DE (US)

(72) Inventors: Stephen E. Terry, Northport, NY (US); Jin Wang, Princeton, NJ (US); Arty Chandra, Roslyn, NJ (US); John S. Chen, Ann Arbor Township, MI (US); Guodong Zhang, Woodbury, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/246,785

(22) Filed: May 3, 2021

(65) Prior Publication Data

US 2021/0258949 A1    Aug. 19, 2021

Related U.S. Application Data

(63) Continuation of application No. 16/274,421, filed on Feb. 13, 2019, now Pat. No. 11,160,058, which is a
(Continued)

(51) Int. Cl.
*H04W 72/04* (2023.01)
*H04W 72/21* (2023.01)
(Continued)

(52) U.S. Cl.
CPC .......... *H04W 72/21* (2023.01); *H04B 7/2621* (2013.01); *H04L 1/1812* (2013.01);
(Continued)

(58) Field of Classification Search
CPC ............ H04L 43/0876; H04L 43/0882; H04L 43/0888; H04L 43/0894; H04L 43/00;
(Continued)

(56) References Cited

U.S. PATENT DOCUMENTS 6,487,184 B1    11/2002   Otting et al.
6,567,388 B1    5/2003    Tomcik et al.
(Continued)

FOREIGN PATENT DOCUMENTS

AU         736793         1/1999
CN         1314747 A      9/2001
(Continued)

OTHER PUBLICATIONS

US 8,208,366 B2, 06/2012, Ahn et al. (withdrawn)
(Continued)

*Primary Examiner* — Dady Chery
(74) *Attorney, Agent, or Firm* — Flaster Greenberg, P.C.

(57) ABSTRACT

In a wireless communication system comprising at least one evolved Node-B (eNB) and a plurality of wireless transmit/receive units (WTRUs), a non-contention based (NCB) channel is established, maintained, and utilized. The NCB channel is allocated for use by one or more WTRUs in the system for utilization in a variety of functions, and the allocation is communicated to the WTRUs. The wireless communication system analyzes the allocation of the NCB channel as required, and the NCB channel is reallocated as required.

22 Claims, 10 Drawing Sheets

Related U.S. Application Data continuation of application No. 15/676,769, filed on Aug. 14, 2017, now Pat. No. 10,271,318, which is a continuation of application No. 14/828,261, filed on Aug. 17, 2015, now Pat. No. 9,781,708, which is a continuation of application No. 14/055,350, filed on Oct. 16, 2013, now Pat. No. 9,203,580, which is a continuation of application No. 11/669,269, filed on Jan. 31, 2007, now Pat. No. 8,619,747.

(60) Provisional application No. 60/886,164, filed on Jan. 23, 2007, provisional application No. 60/763,791, filed on Jan. 31, 2006.

(51) Int. Cl.
*H04B 7/26* (2006.01)
*H04L 1/1812* (2023.01)
*H04W 56/00* (2009.01)
*H04W 74/04* (2009.01)
*H04W 72/20* (2023.01)
*H04L 5/00* (2006.01)

(52) U.S. Cl.
CPC ....... *H04L 5/0037* (2013.01); *H04W 56/0045* (2013.01); *H04W 72/20* (2023.01); *H04W 74/04* (2013.01)

(58) Field of Classification Search
CPC ......... H04L 43/50; H04L 47/10; H04L 47/12; H04L 47/20; H04L 47/24; H04L 47/32; H04L 47/38; H04L 47/70; H04L 47/72; H04L 47/74; H04L 47/78; H04L 47/80; H04L 29/08657; H04B 17/00; H04B 3/46; H04W 24/00; H04W 48/12; H04W 48/16; H04W 48/18; H04W 48/20; H04W 88/06; H04W 36/14; H04W 60/00; H04W 4/02; H04W 64/00; G01S 5/02; G01S 5/14

See application file for complete search history.

(56) References Cited

U.S. PATENT DOCUMENTS

| | | |
|---|---|---|
| 6,684,079 B1 | 1/2004 | Aretz et al. |
| 6,693,892 B1 | 2/2004 | Rinne et al. |
| 6,738,634 B1 | 5/2004 | Shin |
| 6,788,963 B2 | 9/2004 | Laroia et al. |
| 6,807,160 B1 | 10/2004 | Laroia et al. |
| 6,868,079 B1 | 3/2005 | Hunt |
| 6,967,936 B1 | 11/2005 | Laroia et al. |
| 6,980,540 B1 | 12/2005 | Laroia et al. |
| 6,993,294 B2 | 1/2006 | Nobukiyo et al. |
| 7,286,612 B2 | 10/2007 | Ylitalo et al. |
| 7,333,457 B2 | 2/2008 | Gopalakrishnan et al. |
| 7,363,057 B2 | 4/2008 | Ishii et al. |
| 7,457,588 B2 | 11/2008 | Love et al. |
| 7,492,828 B2 | 2/2009 | Keerthi |
| 7,505,448 B2 | 3/2009 | Sheng et al. |
| 7,551,625 B2 | 6/2009 | Ahn et al. |
| 7,778,151 B2 | 8/2010 | Bertrand et al. |
| 7,809,373 B2 | 10/2010 | Park et al. |
| 7,912,471 B2 | 3/2011 | Kodikara et al. |
| 7,948,958 B2 | 5/2011 | Vimpari et al. |
| 8,098,667 B2 | 1/2012 | Julian et al. |
| 8,254,360 B2 | 8/2012 | Julian et al. |
| 8,312,142 B2 | 11/2012 | Rinne et al. |
| RE44,065 E | 3/2013 | Lee et al. |
| 8,582,514 B2 | 11/2013 | Moberg et al. |
| 8,619,747 B2 | 12/2013 | Terry et al. |
| 9,203,580 B2 | 12/2015 | Terry et al. |
| 2002/0141367 A1 | 10/2002 | Hwang et al. |
| 2003/0039270 A1 | 2/2003 | Chang et al. |
| 2003/0064728 A1 | 4/2003 | Speight |
| 2003/0096631 A1 | 5/2003 | Kayama et al. |
| 2003/0202537 A1 | 10/2003 | Rogerson et al. |
| 2003/0210668 A1 | 11/2003 | Malladi et al. |
| 2004/0029622 A1 | 2/2004 | Laroia et al. |
| 2004/0085936 A1 | 5/2004 | Gopalakrishnan et al. |
| 2004/0127226 A1 | 7/2004 | Dugad et al. |
| 2004/0160914 A1 | 8/2004 | Sarkar |
| 2004/0191965 A1 | 9/2004 | Kim et al. |
| 2004/0213199 A1 | 10/2004 | Cheng |
| 2004/0219917 A1 | 11/2004 | Love et al. |
| 2004/0224692 A1 | 11/2004 | Hamabe |
| 2004/0252662 A1 | 12/2004 | Cho |
| 2005/0003843 A1 | 1/2005 | Ho et al. |
| 2005/0043062 A1 | 2/2005 | Ahn et al. |
| 2005/0047429 A1 | 3/2005 | Koo et al. |
| 2005/0078651 A1 | 4/2005 | Lee et al. |
| 2005/0164641 A1 | 7/2005 | Niwano |
| 2005/0181832 A1 | 8/2005 | Ishii et al. |
| 2005/0191965 A1 | 9/2005 | Yu et al. |
| 2005/0201325 A1 | 9/2005 | Kang et al. |
| 2005/0219148 A1 | 10/2005 | Bayley et al. |
| 2005/0238053 A1 | 10/2005 | Iochi et al. |
| 2005/0249148 A1 | 11/2005 | Nakamata et al. |
| 2005/0276252 A1 | 12/2005 | Sizeland et al. |
| 2005/0282568 A1 | 12/2005 | Keerthi et al. |
| 2006/0007889 A1 | 1/2006 | Khan |
| 2006/0159061 A1 | 7/2006 | Takano et al. |
| 2006/0256757 A1 | 11/2006 | Kuusela et al. |
| 2007/0115915 A1 | 5/2007 | Sheng et al. |
| 2007/0014922 A1 | 6/2007 | Parizhsky et al. |
| 2007/0171849 A1 | 7/2007 | Zhang et al. |
| 2007/0171871 A1 | 7/2007 | Forsberg |
| 2011/0158123 A1 | 6/2011 | Kim et al. |
| 2011/0190018 A1 | 8/2011 | Love et al. |
| 2013/0301579 A1 | 11/2013 | Zhang et al. |
| 2014/0044078 A1 | 2/2014 | Terry et al. |
| 2015/0334736 A1 | 11/2015 | Chandra et al. |
| 2017/0367089 A1 | 12/2017 | Terry et al. |

FOREIGN PATENT DOCUMENTS

| | | |
|---|---|---|
| CN | 1491049 A | 4/2004 |
| CN | 1567759 A | 1/2005 |
| CN | 1190102 C | 2/2005 |
| CN | 1575025 A | 2/2005 |
| CN | 1604687 A | 4/2005 |
| CN | 1681348 A | 10/2005 |
| CN | 1685745 A | 10/2005 |
| CN | 2746688 Y | 12/2005 |
| CN | 1930816 A | 3/2007 |
| EP | 1109334 A2 | 6/2001 |
| EP | 1168876 A1 | 1/2002 |
| EP | 1180907 A2 | 2/2002 |
| EP | 1248485 A1 | 10/2002 |
| EP | 1315342 A1 | 5/2003 |
| EP | 1496628 A1 | 1/2005 |
| EP | 1517457 A1 | 3/2005 |
| EP | 1605647 A1 | 12/2005 |
| EP | 1613117 A2 | 1/2006 |
| EP | 1643690 A1 | 4/2006 |
| FR | 2765763 A1 | 1/1999 |
| JP | 11234738 A | 8/1999 |
| JP | 2000507431 A | 6/2000 |
| JP | 2001145155 A | 5/2001 |
| JP | 2001244913 A | 9/2001 |
| JP | 2001268632 A | 9/2001 |
| JP | 2002058065 A | 2/2002 |
| JP | 2002125271 A | 4/2002 |
| JP | 2002526970 A | 8/2002 |
| JP | 2002369258 A | 12/2002 |
| JP | 2003163962 A | 6/2003 |
| JP | 2003318861 A | 11/2003 |
| JP | 2004159300 A | 6/2004 |
| JP | 2005244991 A | 9/2005 |
| JP | 2005333677 A | 12/2005 |
| JP | 2005354537 A | 12/2005 |
| JP | 2006025438 A | 1/2006 |
| JP | 2006505219 A | 2/2006 |

(56) References Cited

FOREIGN PATENT DOCUMENTS

| | | |
|---|---|---|
| JP | 2007511963 | 5/2007 |
| JP | 2007526692 A | 9/2007 |
| JP | 2008502277 A | 1/2008 |
| JP | 2008503933 A | 2/2008 |
| JP | 5075841 B2 | 11/2012 |
| JP | 5770818 B2 | 8/2015 |
| JP | 2016009211 A | 1/2016 |
| JP | 6166394 B2 | 6/2017 |
| RU | 2109327 C1 | 4/1998 |
| WO | 9833346 A2 | 7/1998 |
| WO | 2001011907 A1 | 2/2001 |
| WO | 0161878 A1 | 8/2001 |
| WO | 2002003600 A1 | 1/2002 |
| WO | 03024028 A1 | 3/2003 |
| WO | 03084099 A1 | 10/2003 |
| WO | 03096577 A1 | 11/2003 |
| WO | 2003094550 A1 | 11/2003 |
| WO | 2004016007 A1 | 2/2004 |
| WO | 2004040935 A1 | 5/2004 |
| WO | 2004095860 A1 | 11/2004 |
| WO | 2005039134 A1 | 4/2005 |
| WO | 2005050852 A2 | 6/2005 |
| WO | 2005053329 A1 | 6/2005 |
| WO | 2005088886 A1 | 9/2005 |
| WO | 2005101879 A1 | 10/2005 |
| WO | 2006009713 A1 | 1/2006 |
| WO | 2006020520 A2 | 2/2006 |
| WO | 2007089797 A2 | 8/2007 |

OTHER PUBLICATIONS

File History of U.S. Appl. No. 14/055,350, "Method and Apparatus for Providing and Utilizing a Non-Contention Based Channel in a Wireless Communication System", Filed Oct. 13, 2013, 1143 pages.
File History of U.S. Appl. No. 11/669,269, "Method and apparatus for Providing and Utilizing a Non-Contention Based Channel in a Wireless Communication System", Filed Jan. 31, 2007, 1257 pages.
Oxford Dictionary on Lexico.com, Definition of the word "periodicity", https://www.lexico.com/en/definition/periodicity, Jul. 2, 2020, 4 pages.
Oxford Dictionary of Computing 4th Edition, 1996,, 1996, 8 pages including 1-5 cover pages, 503, 504, and back cover page.
Microsoft Press Computer Dictionary 3rd Edition, Microsoft Press 1997, 1997, 16 pages including 1-10 cover pages, and pp. 49, 191, 208 and 69.
Newton's Telecom Dictionary 22nd Edition, 2006 Harry Newton, 6 pages including cover pp. 1-5, p. 180, and back cover page, 2006, 6 pages including cover pages 1-5, p. 180, and back cover page.
Tutorialspoint, "LTE OFdM Technology" www tutoriaispoint.com/lte/lete_ofdm_technology.htm, Aug. 17, 2020, 1 page.
Merriam-Webster Dictionary definition of "reconfiguration", https://www.merriam-webster.com/dictionary/reconfiguration, Aug. 17, 2020, 5 pages.
Cambridge English Dictionary, Definition of the word "evolved", https://dictionary.cambridge.org/us/dictionary/english/evolved[Aug. 25, 2020 5:03:00 PM], Aug. 25, 2020, 6 pages.
Cambridge English Dictionary definition of "periodic", https://dictionary.cambridge.org/us/dictionary/english/periodic [Aug. 27, 2020 (:44:29 AM] Aug. 27, 2020, 8 pages, Aug. 27, 2020, 8 pages.
"3rd Generation Partnership Project (3GPP)", Directory Listing, /ftp/Specs/archive/25_series/25.814, www.3gpp.org/ftp/Specs archive/25series/25.814, Aug. 14, 2020, 1 page.
"Claim Construction Order", *Interdigital Technology Corporation et al v. Lenovo Holding Company, Inc. et al*, Case No. 1:19-cv-01590-LPS, In the United States District Court for the District of Delaware, May 10, 2021, 24 pages.
"Claimants' Draft Grounds for Invalidity for EP 558", *Interdigital Technology Corporation et al. vs. Lenovo Group Limited et al*; In the High Court of Justice, Business and Property Courts of England and Wales, Intellectual Property List (ChD), Patents Court; Claim No. HP-2019-000032, 1-2.
"Curriculum Vitae Anthony S. Acampora", Petitioners Lenovo Holding Company, Inc Lenovo (United States) Inc., and Motorola Mobility LLC, Exhibit 1004, Inter Partes Review No. IPR23020-01514, Aug. 27, 2020, 43 pages.
"Decision Denying Institution of Inter Partes Review 35 U.S.C. §314", *Lenovo Holding Company, Inc., Lenovo (United States) Inc., and Motorola Mobility LLC, Petition v. Interdigital Technology Corporation*, Patent Owner, Case IPR2020-01514, U.S. Pat. No. 8,619,747 B2, Apr. 15, 2021, 43 pages.
"Decision Denying Institution of Inter Partes Review 35 U.S.C. §314", *Lenovo Holding Company, Inc., Lenovo (United States) Inc., and Motorola Mobility LLC, Petition v. Interdigital Technology Corporation*, Patent Owner, Case IPR2020-01515, U.S. Pat. No. 9,203,580 B2, Apr. 15, 2021, 48 pages.
"Declaration of Anthony Acampora Regarding U.S. Pat. No. 9,203,580", Petitioners Lenovo Holding Company, Inc Lenovo (United States) Inc., and Motorola Mobility LLC, Exhibit 1028, Inter Partes Review No. IPR2020-01515, Aug. 27, 2020, 161 pages.
"Declaration of Anthony Acampora" Regarding U.S. Pat. No. 8,619,747, Petitioners Lenovo Holding Company, Inc Lenovo (United States) Inc., and Motorola Mobility LLC, Exhibit 2003, Inter Partes Review No. IPR2020-01514, Aug. 27, 2020, 217 pages.
"Declaration of Craig Bishop", Petitioners Lenovo Holding Company, Inc Lenovo (United Sates) Inc., and Motorola Mobility LLC, Exhibit 1040, Inter Partes Review No. IPR2020-01514 and IPR2020-01515, U.S. Pat. Nos. 8,619,747 and 9,203,580, Aug. 24, 2020, 83 pages.
"Defendants Lenovo Holding Company, Inc., Lenovo (United States) Inc., and Motorola Mobility LLC's, Answer to Plaintiff's First Amended Complaint", *InterDigital Technology Corporation et al. v. Lenovo Holding Company, Inc. et al*. Case No. 1:19-cv-01590-LPS, In the United States District Court for the District of Delaware, Jul. 28, 2020, 20 pages.
"Defendants' Opening Brief in Support of Their Motion to Dismiss Plaintiffs' Amended Complaint", *InterDigital Technology Corporation et al. v. Lenovo Holding Company, Inc et al*. Case No. 1:19-cv-01590-LPS, In the United States District Court for the District of Delaware, Jan. 10, 2020, 30 pages.
"Defendants' Opening Brief in Support of Their Motion to Dismiss Pursuant to Fed. R. Civ. P. 12(b)(6)", *Interdigital Technology Corporation and Ors. Vs. Lenovo Holding Company, Inc.*, Case No. 1:19-cv-01590-UNA, In the United States District Court for the District of Delaware, pp. 1-25.
"Defendants' Preliminary Invalidity Contentions", *InterDigital Technology Corporation et al. v. Lenovo Holding Company, Inc et al* Case No. 1:19-cv-01590-LPS, In the United States District Court for the District of Delaware, Nov. 18, 2020, 917 pages.
"Flarion FLR 2500 FLASH-OFDM Chipset", Flarion Technologies Inc., 2004, 2 pages.
"Flarion Mobile Broadband Handset Prototype", Flarion Technologies Inc., 2004, 2004, 1 page.
"Grounds of Invalidity for EP 558", *InterDigital Technology Corporation et al. v Lenovo Group Limited et al*., Claim No. HP-2019-000032 in the High Court of Justice Business and Property Courts of England and Wales, Sep. 28, 2020, 3 pages.
"Invalidation Decision", National Intellectual Property Administration, PRC, Case No. 4W110443; Chinese Patent No. 200780004185.1, Apr. 6, 2021, 40 pages.
"Invalidation Decision", National Intellectual Property Administration, PRCX, Case No. 4W110434; Chinese Patent No. 201210165070.3, Apr. 6, 2021, 60 pages.
"Joint Claim Construction Chart", *Interdigital Technology Corporation et al v. Lenovo Holding Company, Inc. et al*, Case No. 1:19-cv-01590-LPS, In the United States District Court for the District of Delaware, Jan. 14, 2021, 25 Pages.
"OFDM for Mobile Data Communications", Flarion Technologies Inc., Mar. 2003, 15 pages.
"Patent Owner's Preliminary Response", *Lenovo Holding Company, Inc. Lenovo (United States) Inc., and Motorola Mobility LLC, Petitioners, v. IPR Licensing*, Case IPR2020-01514, U.S. Pat. No. 8,619,747, Jan. 19, 2021, 52 pages.
"Patent Owner's Preliminary Response", *Lenovo Holding Company, Inc. Lenovo (United States) Inc., and Motorola Mobility LLC,*

(56) References Cited

OTHER PUBLICATIONS

*Petitioners,* v. *IPR Licensing,* Case IPR2020-01515, U.S. Pat. No. 9,203,580, ,, Jan. 22, 2021, 53 pages.
"Petition for Inter Partes Review of U.S. Pat. No. 9,203,580 Under 35 U.S.C. §§ 311-319 and 37 C.F.R. § 42.1-.80 & 42:100-. 123", Petitioners Lenovo Holding Company, Inc Lenovo (United States) Inc., and Motorola Mobility LLC, Inter Partes Review No. IPR2020-01515, Aug. 27, 2020, 103 pages.
"Petition for Inter Partes Review of U.S. Pat. No. 8,619,747 Under 35 U.S.C. §§ 311-319 and 37 C.F.R. § 42.1-.80 & 42.100-.123", Petitioners Lenovo Holding Company, Inc Lenovo (United States) Inc., and Motorola Mobility LLC, Inter Partes Review No. IPR2020-01514, Aug. 27, 2020, 101 pages.
"Plaintiffs' Complaint", *Interdigital Technology Corporation and Ors.* Vs. *Lenovo Holding Company, Inc.,* Case No. 1:19-cv-01590-UNA, In the United States District Court for the District of Delaware, Aug. 28, 2019 00:00:00.0, pp. 1-26.
"Plaintiffs' Counter Claim in CS COMM 295 of 2020", *Beijing Xiaomi Mobile Co., Ltd. & Ors.* vs. *Interedigital Technology Corporation & Ors.*; Counter Claim in CS Comm 295 of 2020 filed Jun. 3, 2021, In The High Court of Delhi, at New Delhi, Jun. 3, 2021, 115 pages.
"Plaintiffs' First Amended Complaint", *Interdigital Technology Corporation and Ors.* Vs. *Lenovo holding Company, Inc.,* Case Number I:19-cv-01590-LPS, In the United States District Court for the District of Delaware, Dec. 9, 2019 00:00:00.0, pp. 1-38.
"The Claimants' Reply Statement of Case on Validity EP (UK) 2,485,558", *InterDigital Technology Corporation et al.* v *Lenovo Group Limited et al.,* Claim No. HP-2019-000032 in the High Court of Justice Business and Property Courts of England and Wales Sep. 18, 2020, 41 pages, Sep. 18, 2020, 41 pages.
"The Defendants Statement of Case on Validity EP (UK) 2,485,558", *InterDigital Technology Corporation et al.* v *Lenovo Group Limited et al.,* Claim No. HP-2019- 000032 in the High Court of Justice Business and Property Courts of England and Wales, Sep. 28, 2000, 4 pages.
"Treatment of Statments of the Applicant in the Challenged Patent in Inter Partes Reviews Under Section 311", Petitioners Lenovo Holding Company, Inc. Lenovo (United States) Inc., and Motorola Mobility LLC, Exhibit 1049, Inter Partes Review No. IPR2020--10514, Memordum to Members of the Patent Trial and Appeal Board from Andrei Iancu, Aug. 18, 2020, 9 pages.
Bosisio , et al., "Multilevel Type-II HARQ with Adaptive Modulation Control", IEEE 2006, 2006, 6 pages, including pp. 2082-2087.
Busson , et al., "Impact of Resource Blocks Allocation Strategies on Downlink Interference and SIR Distributions in LTE Networks: A Stochastic Geometry Approach", Hindawi, Wireless Communications and Mobile Computing, vol. 2018, Article ID 9163783, https://doi.org/10.1155/2018/9163783, 2018, 16 pages.
ETSI TS 125 211 V6.7.0, "Universal Mobile Telecommunication System (UMTS)", "Physical channels and mapping of transport channels onto physical channels" (FDD) (3GPP TS 25.211 version 6.7.0; Release 6, Dec. 2005, 52 pages.
ETSI TS 125 321 V6.7.0, "3rd Generation Partnership Project (3GPP)", Universal Mobile Telecommunications Systems (UMTS); Medium Access Control (MAC) protocol specification; Release 6, Apr. 26, 2021, 1 page.
ETSI TS 125.309 V6.5.0, "Universal Mobile Telecommunication System (UMTS)", "FDD enhanced uplink"; Overall description; Stage 2; (3GPP TS 25.309 version 6.5.0 Release 6), Dec. 22, 2005, 35 pages.
ETSI TS 125.331 V6.8.0 , "Universal Mobile Telecommunications Systems (UMTS)", Universal Mobile Telecommunications System (UMTS), Radio Resource Control (RRC) protocol specification (3GPP TS 25.311 version 6.8.0 Release 6), Dec. 22, 2005, 1175 pages.
Fazel, et al., "Multi-Carrier Spread-Spectrum", Kluwer Academic Publishers, 2003, 10 pages including cover pp. 1-3, pp. v-ix, p. 31, and back cover page.
Frenger, et al., "Performance Comparison of HARQ with Chase Combining and Incremental Redundancy for HSDPA", Ericsson Research, IEEE 2001, 2001, 5 pages including pp. 1829-1833.
Glisic , et al., "Spread Spectrum CDMA Systems for Wireless Communications", Mobile Communications Series, Artech House Publishers,, 16 pages including cover pp. 1-16.
Kondo, Seiji , et al., "Evolution of the 3G Cellular Phone System", Next-Generation Transport, 3 pages.
R2-070056 , "Scheduling Request in E-UTRAN", Ericsson, 3GPP TSG-RAN WG2 #56bis, Sorrento, Italy, pp. 1-11.
R2-070214 , "Contention and Contention-Free Intra-LTE Handovers", Motorola, 3GPP TSG-RAN WG2 #56bis, Sorrento, Italy, 4 pages.
R3-051344 , "Handling of UEs in LTE_Active", Siemens, 3GPP TSG RAN WG3 Meeting #49, Seoul, Korea, pp. 1-6.
S3-050695 , "3rd Generation Partnership Project (3GPP)", 3GPP TSG SA WG3 Security, Meeting SA3#41, "3 Party Authentication and Key Distribution Model", Samsung, San Diego, USA, Nov. 15-18, 2005, 4 pages.
S3-050771 , "3rd Generation Partnership Project (3GPP)", 3GPP TSG SA WG3 Security, Meeting SA3#41, "SAE/LTE: on the Termination point for Security Protection", Ericsson, Siemens, T-Mobile, San Diego, USA, Oct. 15-18, 2005, 7 pages.
TDOC R1-030964 , "Text Proposal on Enhanced CQI Reporting", Philips, Mitsubishi Electric, Siemenes, 3GPP TSG-RAN WG1 Meeting #34, Seoul, Korea, 16 pages.
TDOC R1-051347 , "Uplink Scheduling Procedure", Samsung, 3GPP TSG-RAN WG1 Meeting #43, Seoul, Korea, 5 pages.
TDOC R2-060044 , "3rd Generation Partnership Project (3GPP)", 3rd Generation Partnership Project (3GPP), 3GPP TSG-RAN2, Meeting #50, "LTE Architecture", Samsung, Sophia Antipolis, France, Jan. 9-13, 2005, 4 pages.
TDOC R3-051159 , "3rd Generation Partnership Project (3GPP)", 3GPP TSG-RAN WG2, Meeting #48bis, "Reply LS on Security Requirements for Long Term Evolved RAN/3GPP System Architecture Evolution", RAN2 and RAN3, Cannes, FranceOct. 10-14, 2005, Oct. 10-14, 2005, 3 pages.
TDOC S3-050602 , "3rd Generation Partnership Project (3GPP)", 3GPP TSG-SA WG3, Meeting #40, "Reply LS on Security RequiremTerm Evolved RAN/3GPP System Architecture Evolution", SA3, Portorose, Slovenia, 2005, 3 pages.
Tomcik, Jim , "QFDD Technology Overview Presentation", Qualcomm Incorporated, IEEE 802.20 Working Group on Mobile Broadband Wireless Access, Nov. 15, 2005, 73 pages.
TR 25.814 V0.3.1 , "3rd Generation Partnership Project (3GPP)", "Technical Specification Group Radio Access Network; Physcial Layer Aspects for Evolved UTRA (Release 7)", Nov. 2005, 52 pages.
TR 25.814 V0.3.1 , "3rd Generation Partnership Project (3GPP)", "3rd Generation Partnership Project; Technical Specification Group Radio Access Network; Physical Layer Aspects for Evolved UTRA (Release 7)", Nov. 2005, 57 pages.
TR 25.814 V1.0.1 , "3rd Generation Partnership Project (3GPP)", Technical Specification Group Radio Access Network Physical Layer Aspects for Evolved UTRA, (Release 7), Nov. 1, 2005 00:00:00.0, pp. 1-72.
TR 25.840 V4.0.0 , "3rd Generation Partnership Project (3GPP)", Technical Specification Group Radio Access Network, Terminal Power Saving Features (Release 4), Dec. 1, 2003 00:00:00.0, 30 pages.
TR 25.903 V0.2.0 , "3rd Generation Partnership Project (3GPP)", 3rd Generation Partnership Project; Technical Specification Group Radio Access Network, Continuous Connectivity for Packet Data Users, (Release 7), Nov. 1, 2005 00:00:00.0, pp. 1-36.
TR 25.913 V7.3.0 , "3rd Generation Partnership Project (3GPP)", Technical Specification Group Radio Access Network; Requirements for Evolved UTRA (E-UTRA) and Evolved UTRAN (E-UTRAN) (Release 7), Mar. 2006, 18 papes.
TS 125 224 V6.4.0 , "The European Telecommunications Standards Institute (ETSI)", Universal Mobile Telecommunications System (UMTS), Physical Layer Procedures (TDD) (3GPP TS 25.224 Version 6.4.0 Release 6), Mar. 1, 2005 00:00:00.0, pp. 1-51.
TS 125 224 V6.5.0 , "The European Telecommunications Standards Institute (ETSI)", Universal Mobile Telecommunications System

(56) References Cited

OTHER PUBLICATIONS (UMTS), Physical Layer Procedures (TDD) (3GPP TS 25.224 V6.5.0 Release 6), Jun. 1, 2005 00:00:00.0, pp. 1-51.
TS 125 224 V7.1.0 , "European Telecommunications Standards Institute (ETSI)", Universal Mobile Telecommunications System (UMTS), Physical layer procedures (TDD) (3GPP TS 25.224 version 7.1.0 Release 7), Sep. 1, 2006 00:00:00.0, 63 pages.
TS 125 225 V6.1.0 , "European Telecommunications Standards Institute (ETSI)", Universal Mobile Telecommunications System (UMTS), Physical layer; Measurements (TDD) (3GPP TS 25.225 V6.1.0 Release 6), Mar. 1, 2004 00:00:00.0, pp. 1-26.
TS 125 225 V7.2.0 , "European Telecommunications Standards Institute (ETSI)", Universal Mobile Telecommunications System (UMTS), Physical Layer, Measurements (TDD) (3GPP TS 25.225 V7.2.0 Release 7), Sep. 1, 2006 00:00:00.0, 27 pages.
TS 125 427 V6.5.0 , "European Telecommunications Standards Institute (ETSI)", Universal Mobile Telecommunications System (UMTS), UTRAN Lur/Lub Interface User Plane Protocol for DCH Data Streams (3GPP TS 25.427 V6.5.0 Release 6), Dec. 1, 2005 00:00:00.0, pp. 1-43.
TS 125 427 V7.3.0 , "European Telecommunications Standards Institute (ETSI)", Universal Mobile Telecommunications System (UMTS), UTRAN Lur/Lub Interface User Plane Protocol for DCH Data Streams (3GPP TS 25.427 V7.3.0 Release 7), Dec. 1, 2006 00:00:00.0, pp. 1-46.
TS 25.211 V4.6.0 , "3rd Generation Partnership Project (3GPP)", Technical Specification Group Radio Access Network, Physical Channels and Mapping of Transport Channels onto Physical Channels (FDD) (Release 4), Sep, 1, 2002 00:00:00.0, pp. 1-46.
TS 25.211 V5.8.0 , "3rd Generation Partnership Project (3GPP)", Technical Specification Group Radio Access Network, Physical Channels and Mapping of Transport Channels onto Physical Channels (FDD) (Release 5), Dec. 1, 2005 00:00:00.0, pp. 1-39.
TS 25.214 V5.9.0 , "3rd Generation Partnership Project (3GPP)", Technical Specification Group Radio Access Network, Physical Layer Procedures (FDD) (Release 5), Jun. 1, 2004 00:00:00.0, pp. 1-64.
TS 25.309 V6.5.0 , "3rd Generation Partnership Project (3GPP)", 3rd Generation Partnership Project (3GPP); Technical Specification Group Radio Access Network; FDD Enhanced Uplink; Overal description; Stage 2 (Release 6), Dec. 1, 2005 00:00:00.0, 1-34.
TS 25.309 V6.5.0 , "3rd Generation Partnership Project (3GPP)", Technical Specification Group Radio Access Network; FDD Enhanced Uplink; Overall description; Stage 2 (Release 6), Dec. 2005, 34 pages.
TS 25.321 V6.7.0 , "3rd Generation Partnership Project (3GPP)", 3rd Generation Partnership Project; Technical Specification Group Radio Access Network; FDD Enhanced Uplink; Overall description; Stage 2 (Release 6), Dec. 2005, 91 pages.
TS 25.331 V6.8.0 , "3rd Generation Partnership Project (3GPP)", Dec. 2005, 1174 pages.
TS 45.002 V5.11.0 , "3rd Generation Partnership Project (3GPP)", Technical Specification Group GSM/EDGE Radio Access Network; Multiplexing and multiple access on the radio path (Release 5), Aug. 2003, 84 pages.
Kwon, et al., "Quasi-Dedicated Access Scheme for Uplink Realtime Services in Future Wireless Communication Systems", Korea Advanced Institute of Science and Technology (KAIST), 2005, 5 pages.
Laroia, et al., "Designing a Mobile Broadband Wireless Access Network", IEEE Signal Processing Magazine, Sep. 2004, 9 pages including pp. 20-28.
Myung, et al., "Peak-to-Average Power Ratio of Single Carrier FDMA Signals with Pulse Shaping", Polytechnic University, IEEE 2006, 2006, 5 pages.
Myung, et al., "Single Carrier FDMA for Uplink Wireless Transmission", IEEE Vehicular Technology Magazine, Sep. 2006, 9 pages including pp. 30-38.
R1-041360, "Open aspects of scheduling signalling", 3rd Generation Partnership Project; 3GPP TSG RAN WG1 #39; Siemens; Shin Yokohama, Japan, 4 pages.
R1-050249, "3rd Generation Partnership Project (3GPP)", NTT DoCoMo, Inc., PowerPoint Presentation, "Downlink Multiple Access Scheme for Evolved UTRA", 45 pages.
R1-050249, "Downlink Multiple Access Scheme for Evolved UTRA", 3rd Generation Partnership Project (3GPP), NTT DoCoMo, 3GPP TSG RAN WG1 Meeting #40bis, Beijing, China, pp. 1-8.
R1-050464, "Physical Channel Structures for Evolved UTRA", 3rd Generation Partnership Project (3GPP); 3GPP TSG RAN WG1 Meeting #41 ; NTT DoCoMo; Athens, Greece, 13 pages.
R1-050845, "EUTRA Downlink Multiplexing of Localized and Distributed Channels", Huawei, 3GPP TSG RAN WG1, London, UK, 9 pages.
R1-051143, "Multiplexing Method of Shared Control Channel in Uplink Single-Carrier FDMA Radio Access", NTT DoCoMo, Fujitsu, Mitsubishi Electric Corporation, NEC, Panasonic, SHARP, Toshiba Corporation, TSG-RAN WG1 #42bis, San Diego, USA, pp. 1-8.
R1-051306, "Revised Text Proposal on Multiplexing Method of L1/L2 Control Signaling in Uplink Single-Carrier FDMA Radio Access", TSG-RAN WG1 #43; Ericsson et al.; Seoul, South Korea, 4 pages.
R1-051430, "Further Considerations on Multiplexing Method of Shared Control Channel in Uplink Single-Carrier FDMA", Huawei, TSG-RAN WG1 #43, Seoul, Korea, pp. 1-6.
R1-051570, "Revised Text Proposal on Multiplexing Method of L1/L2 Control Signaling in Uplink Single-Carrier FDMA Radio Access", Ericsson, Fujitsu, Huawei, Mitsubishi Electric Corporation, Motorola, NEC, Nokia, NTT DoCoMo, Panasonic, Samsung, SHARP, Siemens, Toshiba Corporation, TSG-RAN WG1 #43, Seoul, Korea, pp. 1-3.
R1-051624, "3rd Generation Partnership Project (3GPP)", "TR 25.814 v0.4.2 Physical Layer Aspects for Evoloved UTRA", TSG-RAN WG1, Meeting #43, Seoul, Korea, Nov. 7-11, 2005, 79 pages.
R1-060032, "3rd Generation Partnership Project (3GPP)", "L1/L2 Control Channel Structure for E-UTRA Downlink", 3GPP TSG-RAN WG1 LTE Ad Hoc Meeting, Helsinki, Finland, Jan. 23-25, 2006, 9 pages.
R1-060155, "Scheduling and Multiplexing of CQI and ACK/NACK Feedback for Single Carrier FDMA in Evolved UTRA Uplink", InterDigital, 3GPP TSG-RAN WG1 WG1 LTE Ad Hoc Meeting, Helsinki, Finland, pp. 1-8.
R1-060241, "Initial Access Procedure and Uplink Synchronisation", IPWireless, 3GPP TSG RAN WG1 LTE Ad Hoc, Helsinki, Finland, 10 pages.
R1-060364, "Scheduling and Multiplexing of CQI and ACK/NACK Feedback for Single Carrier FDMA in Evolved UTRA Uplink", InterDigital, 3GPP TSG RAN WG1 Meeting #44, Denver, USA, pp. 1-8.
R1-060637, "Initial Access Procedure and Uplink Synchronisation", IPWireless, 3GPP TSG RAN WG1 #44, Denver, Colorado, USA, 10 pages.
R1-060852, "Scheduling and Multiplexing of CQI and ACK/NACK Feedback for Single Carrier FDMA in Evolved UTRA Uplink", InterDigital, 3GPP TSG RAN WG1 Meeting #44bis, Athens, Greece, pp. 1-8.
R1-062318, "3rd Generation Partnership Project (3GPP)", Uplink resource request for uplink scheduling; 3GPP TSG RAN WG1 #46, Tallinn, Estonia, Aug. 28-Sep. 1, 2006, 3 pages.
R1-070041, "Dynamic Contention Free Scheduling Request", Motorola, 3GPP TSG RAN1#47-bis, Sorrento, Italy, 3 pages.
R1-070042, "3rd Generation Partnership Project (3GPP)", Motorola, "Non-Synchronized Random Access," 3GPP TSG-RAN WG1#47bis Meeting, Sorrento, Italy, Jan. 15-19, 2006, 5 pages.
R1-070100, "3rd Generation Partnership Project (3GPP)", NTT DoCoMo, Fujitsu, KDDI, Mitsubishi Electric, Sharp, Toshiba Corporation, "CDMA-Based Multiplexing Method for Multiple ACK/NACK and CQI in E-UTRA Uplink," 3GPP TSG-RAN WG1#47bis, Sorrento, Italy (Original R1-062742), Jan. 15-19, 2007, 8 pages.
R1-070260, "3rd Generation Partnership Project (3GPP)", Texas Instruments, "Contention-Free Preamble-Based Synchronized RACH: Comparison with other solutions," 3GPP TSG-RAN WG1#47bis Meeting, Sorrento, Italy, Jan. 15-19, 2007, 10 pages.

(56) References Cited

OTHER PUBLICATIONS

R1-070378, "3rd Generation Partnership Project (3GPP)", "UL Resource Request for LTE System", Nokia, 3GPP TSG RAN WG1, Meeting # 47bis, Sorrento, Italy, Jan. 15-19, 2007, 3 pages.
R1-070379, "3rd Generation Partnership Project (3GPP)", "Multiplexing for Dedicated Resource Request", Nokia, 3GPP TSG RAN WG1, Meeting # 47bis, Sorrento, Italy, Jan. 15-19, 2007, 3 pages.
R1-070398, "3rd Generation Partnership Project (3GPP)", Nokia, "Structure and transport of the Downlink Control Channel," 3GPPTSG-RAN WG1#47bis Meeting, Sorrento, Italy, Jan. 15-19, 2007, 9 pages.
R2-050346, "3rd Generation Partnership Project (3GPP)", "Buffer Status Reporting Triggers for EDCH", Samsung, 3GPP TSG-RAN2 #46, Scottsdale, USA, Feb. 14-18, 2005, 4 pages.
R2-050835, "3rd Generation Partnership Project (3GPP)", Buffer Status Reporting Triggers for EDCH, Samsung, 3GPP TSG-RAN2 #46bis, Beijing, China, Apr. 4-8, 2005, 3 pages.
R2-051267, "3rd Generation Partnership Project (3GPP)", Further clarifications on Scheduling Information, Infereon, 3GPP TSG-RAN WG2 #47, Athens, Greece, May 9-13, 2005, 3 pages.
R2-051272, "Uplink Signalling Architecture for 3.84Mcps TDD Enhanced Uplink", IPWireless, 3GPP TSG RAN WG2#47, Athens, Greece, 4 pages.
R2-051858, "3rd Generation Partnership Project (3GPP)", "LTE Transport Channels & Channel mapping", Samsung, 3GPP TSG RAN2#48, London, UK, Aug. 29-Sep. 2, 2005, 3 pages.
R2-052102, "3rd Generation Partnership Project (3GPP)", Resource Request and UL scheduling for evolved UTRA, ETRI, 3GPP TSG-RAN WG2 LTE, London, England, Aug. 31, 2005, 4 pages.
R2-052408, "3rd Generation Partnership Project (3GPP)", "LTE State & State transitions", 3GPP TSG RAN # 48 bis, Cannes, France, Oct. 10-14, 2005, 3 pages.
R2-052409, "3rd Generation Partnership Project (3GPP)", "LTE State & State transitions", Samsung, 3GPP TSG RAN2, Meeting # 48bis, Cannes, France, Oct. 10-14, 2005, 3 pages.
R2-052409, "Samsung", LTE State & State transitions; 3GPP TSG RAN2#48bis, Cannes, France, pp. 1-3.
R2-060034, "RRC Connection Establishment Procedure for E-UTRA", IPWireless, 3GPP TSG RAN WG2 #50, Sophia Antipolis, France, pp. 1-8.
R2-060035, "Non-Scheduled Up-Link Shared Transport Channel for E-UTRA", IPWireless, 3GPP TSG RAN WG2 #50, Sophia Antipolis, France, pp. 1-3.
R2-060041, "3rd Generation Partnership Project (3GPP)", "Initial cell access in LTE", Samsung, 3GPP TSG-RAN2 #50, Sophia Antipolis, France, Jan. 9-13, 2006, 3 pages.
R2-060059, "3rd Generation Partnership Project (3GPP)", "Uplink Transport Channels in LTE" 3GPP TSG RAN WG2#50, Sophia-Antipolis, France, Jan. 9-13, 2006, 3 pages.
R2-060059, "Upiink Transport Channels in LTE", Ericsson, 3GPP TSG RAN WG2#50, Sophia-Antipolis, France, 3 pages.
R2-060105, "3rd Generation Partnership Project (3GPP)", 3GPP TSG-RAN WG2, Meeting #50 , "MAC Architecture of LTE", LG Electronics Inc., Sophia Antipolis, France, Jan. 9-13—Niith, Jan. 9-13, 2006, 4 pages.
R2-060109, "3rd Generation Partnership Project (3GPP)", "LTE MAC scheduling and signaling parameters", 3GPP TSG RAN WG2 Meeting #50, Sophia Antipolis, France, Jan. 9-13, 2006, 3 pages.
R2-060109, "LTE MAC Scheduling and Signaling Parameters", LG Electronics, 3GPP TSG RAN WG2 Meeting #50, Sophia Antipolis, France, 3 pages.
R2-060132, "RRC Connection Estabiishment Procedure for E-UTRA", IPWireless, 3GPP TSG RAN WG2 #50, Sophia Antipolis, France, pp. 1-8.
R2-060152, "3rd Generation Partnership Project (3GPP)", Nortel, "Consideration on UL RACH scheme for LTE," 3GPP TSG RAN1 Ad Hoc Meeting, Helsinki, Finland, Jan. 23-25, 2006, 3 pages.
R2-060373, "3rd Generation Partnership Project (3GPP)", "Internal MAC Architecture", Samsung, NTT DoCoMo, Inc., 3GPP TSG-RAN2 #51, Denver, U.S.A., Feb. 13-17, 2006, 3 pages.

R2-063183, "Periodic Scheduling of Upiink Resources for LTE VoIP", InterDigital Communications Corporation, 3GPP TSG RAN WG2 #56, Riga, Latvia, 6 pages.
3GPP TR 25.813 V7.1.0 , "Technical Specification Group Radio Access Network", 3rd Generation Partnership Project; Evolved Universal Terrestrial Radio Access (E-UTRA) and Evolved Universal Terrestrial Radio Access Network (E-UTRAN); Radio interface protocol aspects (Release 7), Sep. 2006, 41 pages.
3GPP TR 25.814 V7.1.0 , "Technical Specification Group Radio Access Network; Physical layer aspects for evolved Universal Terrestrial Radio Access (UTRA) (Release 7)", Third Generation Partnership Project, Sep. 2006, 132 pages.
3GPP TR 25.913 V7.2.0 , "Technical Specification Group Radio Access Network", 3rd Generation Partnership Project; Requirements for Evolved UTRA (E-UTRA) and Evolved UTRAN (E-UTRAN) (Release 7), Dec. 2005, 17 pages.
R1-060256 , "Text proposal on scheduling", TSG-RAN WG1 LTE AdHoc Helsinki, Finland, Jan. 23-25, 2006, 1 page.
R1-070471 , "Scheduling Request in E-UTRAN", 3GPP TSG-RAN WG2 #47bis Sorrento, Italy, Jan. 15-19, 2007, 11 pages.
3GPP TR 25.814 , "3rd Generation Partnership Project; Technical Specification Group Radio Access Network; Physical layer aspects for evolved Universal Terrestrial Radio Access (UTRA) (Release 7)", Nov. 2005, pp. 1-72.
3GPP TS 25.309 V.6.5.0 , "Technical Specification Group Radio Access Network; FDD Enhanced Uplink; Overall description; Stage 2 (Release 6)", 3rd Generation Partnership Project, Dec. 2005, pp. 1-34.
3GPP TS 36.211 V8.9.0 , "Technical Specification Group Radio Access Network; Evolved Universal Terrestrial Radio Access (E-UTRA); Physical Channels and Modulation (Release 8)", 3rd Generation Partnership Project, Dec. 2009, pp. 1-83.
3GPP TS 36.212 V8.8.0 , "Technical Specification Group Radio Access Network; Evolved Universal Terrestrial Radio Access (E-UTRA); Multiplexing and channel coding (Release 8)", 3rd Generation Partnership Project, Dec. 2009, pp. 1-60.
3GPP TS 36.213 V8.8.0 , "Technical Specification Group Radio Access Network; Evolved Universal Terrestrial Radio Access (E-UTRA); Physical layer procedures (Release 8)", 3rd Generation Partnership Project, Sep. 2009, pp. 1-77.
3GPP TS 36.300 V8.12.0 , "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3rd Generation Partnership Project, Mar. 2010, pp. 1-149.
3GPP TS 36.321 V8.12.0 , "Technical Specification Group Radio Access Network; Evolved Universal Terrestrial Radio Access (E-UTRA); Medium Access Control (MAC) protocol specification (Release 8)", 3rd Generation Partnership Project, Mar. 2012, pp. 1-47.
3GPP TS 36.331 V8.21.0 , "Technical Specification Group Radio Access Network; Evolved Universal Terrestrial Radio Access (E-UTRA); Radio Resource Control (RRC); Protocol specification (Release 8)", 3rd Generation Partnership Project, Jun. 2014, pp. 1-219.
3GPP TS 38.211 V15.8.0 , "Technical Specification Group Radio Access Network; NR; Physical channels and modulation (Release 15)", 3rd Generation Partnership Project, Dec. 2019, pp. 1-97.
3GPP TS 38.212 V15.8.0 , "Technical Specification Group Radio Access Network; NR; Multiplexing and channel coding (Release 15)", 3rd Generation Partnership Project, Dec. 2019, pp. 1-101.
3GPP TS 38.213 V15.9.0 , "Technical Specification Group Radio Access Network; NR; Physical layer procedures for control (Release 15)", 3rd Generation Partnership Project, Mar. 2020, pp. 1-109.
3GPP TS 38.214 V15.9.0 , "Technical Specification Group Radio Access Network; NR; Physical layer procedures for data (Release 15)", 3rd Generation Partnership Project, Mar. 2020, pp. 1-107.
3GPP TS 38.300 V15.9.0 , "Technical Specification Group Radio Access Network; NR; NR and NG-RAN Overall Description; Stage 2 (Release 15)", 3rd Generation Partnership Project, Mar. 2020, pp. 1-100.

(56) References Cited

OTHER PUBLICATIONS

3GPP TS 38.321 V15.8.0 , "Technical Specification Group Radio Access Network; NR; Medium Access Control (MAC) protocol specification (Release 15)", 3rd Generation Partnership Project, Dec. 2019, pp. 1-78.

3GPP TS 38.331 V15.9.0 , "Technical Specification Group Radio Access Network; NR; Radio Resource Control (RRC) protocol specification (Release 15)", 3rd Generation Partnership Project, Mar. 2020, pp. 1-536.

*Lenovo Holding Company, Inc. and Motorola Mobility LLC* vs. *InterDigital Technology Corporation* (Patent Owner of Patent U.S. Pat. No. 9,203,580B2), IPR2020-01515, dated Apr. 15, 2021, pp. 1-48.

ETSI SMG2 #35, Tdoc SMG2 548/00, Nortel Networks, GSM/EDGE Radio Access Network (GERAN), Real-Time Fast Associated Control Channel (RTFACCH): Streaming Traffic Class, pp. 1-27.

3GPP TSG RAN WG2 #50, "Uplink Transport Channels in LTE", Ericsson, Sophia-Antipolis, Jan. 9-13, 2006, R2-060059, pp. 1-3.

3GPP TSG RAN WG2 #56, "Periodic Scheduling of Uplink Resources for LTE VoIP", InterDigital Communications Corporation, Nov. 6-10, 2006, R2-063183, pp. 1-6.

3GPP TSG RAN2 #48BIS, "LTE State & State Transitions", Samsung, Oct. 10-14, 2005, R2-052409, pp. 1-3.

3GPP TSG RAN2 #48, "LTE Transport Channels & Channel Mapping", Samsung, Sep. 2-Aug. 29, 2005, R2-051858, pp. 1-3.

3GPP TSG-RAN2 Meeting #50, "Initial Cell Access in LTE", Samsung, Jan. 9-13, 2005, Tdoc R2-060041, pp. 1-3.

3GPP TR 25.814 V0.5.0, "Physical Layer Aspects for Evolved UTRA (Release 7)", Nov. 2005, pp. 1-72.

ETSI TS 100 936 V7.0.0, "Digital Cellular Telecommunications System (Phase 2+); Layer 1; General Requirements (GSM 04.04 version 7.0.0 Release 1998)", Aug. 1999, pp. 1-23.

R1-050882 , "3rd Generation Partnership Project (3GPP)", Samsung, "Data and Control Multiplexing in SC-FDMA Uplink for Evolved UTRA" 3GPP TSG RAN WG1 Meeting #42, London, UK, Aug. 29-Sep. 2, 2005, 5 pages.

R1-050899 , "3rd Generation Partnership Project (3GPP)", Qualcomm Europe, "Considerations on Multiplexing of Control and User Data for xFDMA based E-UTRA Uplink Evaluation", #GPP TSG-RAN WG1 #42, London, United Kingdom, Aug. 29-Sep. 2, 2005, 6 pages.

R1-060111 , "3rd Generation Partnership Project (3GPP)", Ericsson, "Uplink Control Signaling for E-UTRA", TSG-RAN WG1 LTE Ad Hoc, Helsinki, Finland, Jan. 23-25, 2006, 3 pages.

R1-060161 , "3rd Generation Partnership Project (3GPP)", Panasonic, "Inclusion of Additional Data on RACH"; TSG-RAN WG1 LTE Ad hoc Meeting, Helsinki, Finland, Jan. 23-25, 2006, 5 pages.

R1-060536 , "3rd Generation Partnership Project (3GPP)", LG Electronics, "Uplink Resource Request for Uplink Scheduling"; 3GPP TSG RAN WG1#44, Denver, Colorado, Feb. 13-17-2006, 3 pages.

R1-060583 , "3rd Generation Partnership Project (3GPP)", Ericsson, NTT DoCoMo, "E-UTRA Uplink Control Signaling Overhead Assessment"; TSG-RAN WGA1 #44, Denver Colorado, Feb. 13-17, 2006, 3 pages.

R2-060592 , "3rd Generation Partnership Project (3GPP)", Ericsson, "Initial Random Access and Identity Handling" TSG-RAN WG2 Meeting #51, Denver, Colorado, Feb. 13-17, 2006, 7 pages.

3rd Generation Partnership Project (3GPP); Physical channels and mapping of transport channels onto physical channels (FDD) (Release 6); 3GPP TS 25.211 V6.5.0 (Jun. 2005); Valbonne, France, 49 pages.

3rd Generation Partnership Project (3GPP); "Radio Resource Control (RRC); Protocol Specification (Release 4)", 3GPP TS 25.331 V4.17.0 (Mar. 2005); Valbonne, France.

3rd Generation Partnership Project (3GPP); "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V0.3.0 (Jan. 2006); 25 pages.

IEEE STD 802.16TM—2004 , "Part 16: Air Interface for Fixed Broadband Wireless Access Systems, Oct. 1, 2004", Revision of IEEE Std 802.16-2001, 895 pages.

Third Generation Partnership Project (3GPP), "Uplink Timing Control", Motorola, 3GPP TSG-RAN WG1#47bis, Jan. 15-19, 2006, R1-070045, 3 pages.

Third Generation Partnership Project (3GPP), "Initial cell access in LTE (resubmission of R2-052798)", 3GPP TSG-RAN3 Meeting #49, Nov. 7-Nov. 11, 2005, R3-051360, 3 pages.

Third Generation Partnership Project (3GPP), "Presentation of Specification to TSG or WG", 3GPP TSG-SA#32, Jun. 5-8, 2006, SP-060434, 17 pages.

METHOD AND APPARATUS FOR PROVIDING AND UTILIZING A NON-CONTENTION BASED CHANNEL IN A WIRELESS COMMUNICATION SYSTEM

CROSS REFERENCE TO RELATED APPLICATIONS

This application is a continuation of U.S. patent application Ser. No. 16/274,421, filed Feb. 13, 2019, which is a continuation of U.S. patent application Ser. No. 15/676,769, filed Aug. 14, 2017, which issued as U.S. Pat. No. 10,271,318, on Apr. 23, 2019, which is a continuation of U.S. patent application Ser. No. 14/828,261, filed Aug. 17, 2015, which issued as U.S. Pat. No. 9,781,708, on Oct. 3, 2017, which is a continuation of U.S. patent application Ser. No. 14/055,350, filed Oct. 16, 2013, which issued as U.S. Pat. No. 9,203,580, on Dec. 1, 2015, which is a continuation of U.S. patent application Ser. No. 11/669,269, filed Jan. 31, 2007, which issued as U.S. Pat. No. 8,619,747, on Dec. 31, 2013, which claims the benefit of U.S. Provisional Application No. 60/886,164, filed Jan. 23, 2007 and U.S. Provisional Application No. 60/763,791, filed Jan. 31, 2006, which are incorporated by reference herein as if fully set forth.

FIELD OF INVENTION

The present invention relates to wireless communication systems. More particularly, the present invention relates to a method and apparatus for providing and utilizing a non-contention based channel in a wireless communication system.

BACKGROUND

The Long Term Evolution (LTE) of wideband code division multiple access (WCDMA) third generation (3G) cellular networks is directed to universal mobile telecommunication systems (UMTS) beyond the third generation partnership project (3GPP) Release 7. LTE may also be referred to as evolved UMTS terrestrial radio access (E-UTRA). One of the main technological challenges of such networks is efficient channel usage when there is a varied traffic mix in the system. This may be particularly challenging when the various types of traffic utilize different transmission protocols, such as voice over internet protocol (VoIP), file transfer protocol (FTP), or hypertext transfer protocol (HTTP). For example, in any particular wireless communication system, there may be numerous VoIP users, FTP users, and HTTP users all transmitting simultaneously.

Additionally, the wireless transmit/receive units (WTRUs) in the system perform a variety of tasks and functions that require access to the transmission medium in order to communicate with a base station. For example, the WTRUs must perform functions such as timing advance, measurement reporting, requesting uplink (UL) physical resource allocation, providing schedule information for downlink (DL) allocation, keep-alive heartbeat, hybrid automatic repeat request (HARQ) feedback and/or Medium Access Control (MAC) or Radio Resource Control (RRC) layer signaling.

The WTRUs in a wireless communication system could utilize a Random Access Channel (RACH) or physical RACH (PRACH) in order to communicate with the base station to perform these functions. However, a RACH is a contention-based channel, and its use incurs delays that tend to affect quality of service (QoS) and may result in inefficient use of physical resources. A reliance on RACH for interactive applications between transmissions may also negatively impact system capacity.

Alternatively, the WTRU could utilize a UL shared channel to perform these functions. However, a UL shared channel resource request would first have to be transmitted on a RACH/PRACH, which would be an inefficient use of resources and would add delay to these functions due to the two step procedure.

In the context of LTE, it would be desirable to utilize an access protocol such as a non-contention based (NCB) channel, which may also be referred to as a "thin" or "dedicated" channel. Thin channels are generally contention-free, or low contention, control channels that are primarily used for access.

It would therefore be advantageous to provide a method and apparatus for providing and utilizing an NCB channel that would not be subject to the limitations of the current state of the art.

SUMMARY

The present invention is directed to the establishment, maintenance, and utilization of a non-contention based (NCB) channel in a wireless communication system comprising at least one Evolved Node-B (eNB) and a plurality of wireless transmit/receive units (WTRUs). Each NCB channel is dedicated and allocated for use by a particular WTRU in the system for utilization in a variety of functions, and the allocation is communicated to the WTRUs in the system by the eNB. The wireless communication system analyzes the allocation of each NCB channel as required, and each NCB channel is reallocated as required.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station (STA), a mesh point (MP), a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In general, the present invention is directed to a method and apparatus for establishing, maintaining, and utilizing non-contention based (NCB) dedicated channels. The NCB channels, in a preferred embodiment of the present invention, are channels that are dedicated to a particular WTRU for use during a particular time and may be re-allocated depending on system need. The NCB channel utilization may aid in avoiding latency and inefficient use of physical resources associated with an UL contention based procedure, and may also be used in downlink or in ad-hoc networks.

Figure 1:
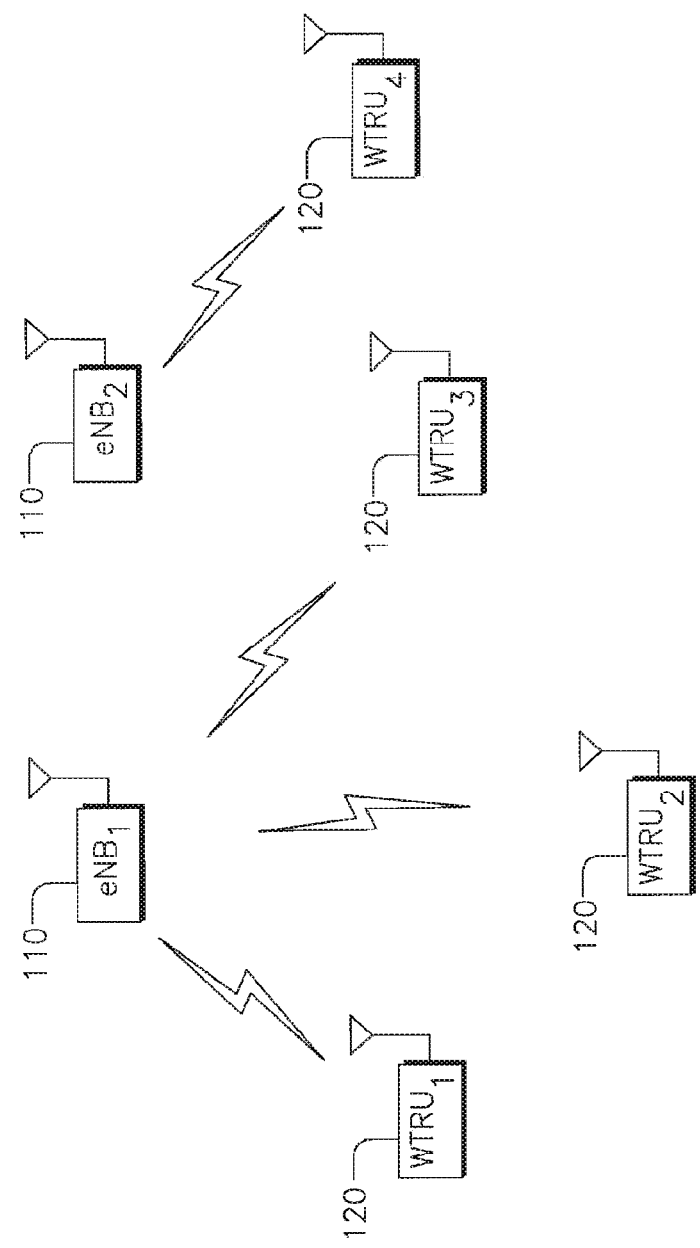
FIG. 1 shows an exemplary wireless communication system configured in accordance with the present invention.

FIG. 1 shows an exemplary wireless communication system 100 (also referred to hereinafter as "system") configured in accordance with the present invention. The wireless communication system 100 includes a plurality of evolved Node-Bs (eNBs) 110 (designated as eNB$_1$ and eNB$_2$) and a plurality of WTRUs 120 (designated WTRU$_1$, WTRU$_2$, WTRU$_3$, and WTRU$_4$), in wireless communication with the eNBs 110. The WTRUs 120 depicted in the wireless communication system 100 may comprise any combination of WTRUs, such as STAs, MPs, and the like. In a preferred embodiment, the eNBs 110 provide access to a network to the WTRUs 120 (WTRU$_1$, WTRU$_2$, WTRU$_3$, and WTRU$_4$) in communication with them. As shown in an exemplary configuration in FIG. 1, WTRU$_1$, WTRU$_2$, and WTRU$_3$ are currently in communication with eNB$_1$ while WTRU$_4$ is in currently in communication with eNB$_2$. However, any of the WTRUs 120 may be in communication with either of the eNBs 110, apart from what is depicted in FIG. 1.

Figure 2:
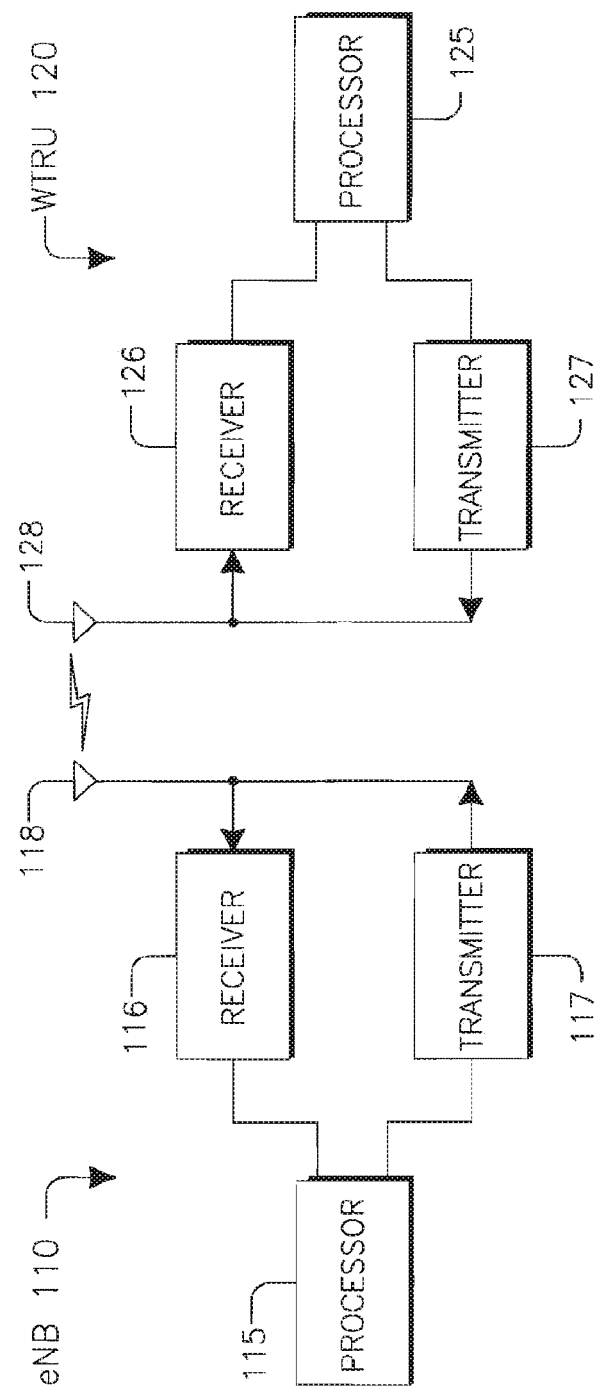
FIG. 2 is a functional block diagram of an eNB and a WTRU of the wireless communication system of FIG. 1.

FIG. 2 is a functional block diagram of the eNB 110 and a WTRU 120 of the wireless communication system 100 of FIG. 1. As shown in FIG. 2, the eNB 110 and WTRU 120 are in wireless communication with one another, and are configured to utilize an NCB channel in the wireless communication system 100. In one example, the WTRU 120 may be a mobile STA or an MP in communication with the eNB 110, which provides access to a network for the WTRU 120.

In addition to the components that may be found in a typical eNB, the eNB 110 includes a processor 115, a receiver 116, a transmitter 117, and an antenna 118. The processor 115 is configured to establish, maintain and utilize an NCB channel in accordance with the present invention. The receiver 116 and the transmitter 117 are in communication with the processor 115. The antenna 118 is in communication with both the receiver 116 and the transmitter 117 to facilitate the transmission and reception of wireless data.

Similarly, in addition to the components that may be found in a typical WTRU, the WTRU 120 includes a processor 125, a receiver 126, a transmitter 127, and an antenna 128. The processor 125 is configured to establish, maintain and utilize an NCB channel in accordance with the present invention. The receiver 126 and the transmitter 127 are in communication with the processor 125. The antenna 128 is in communication with both the receiver 126 and the transmitter 127 to facilitate the transmission and reception of wireless data.

Figure 3:
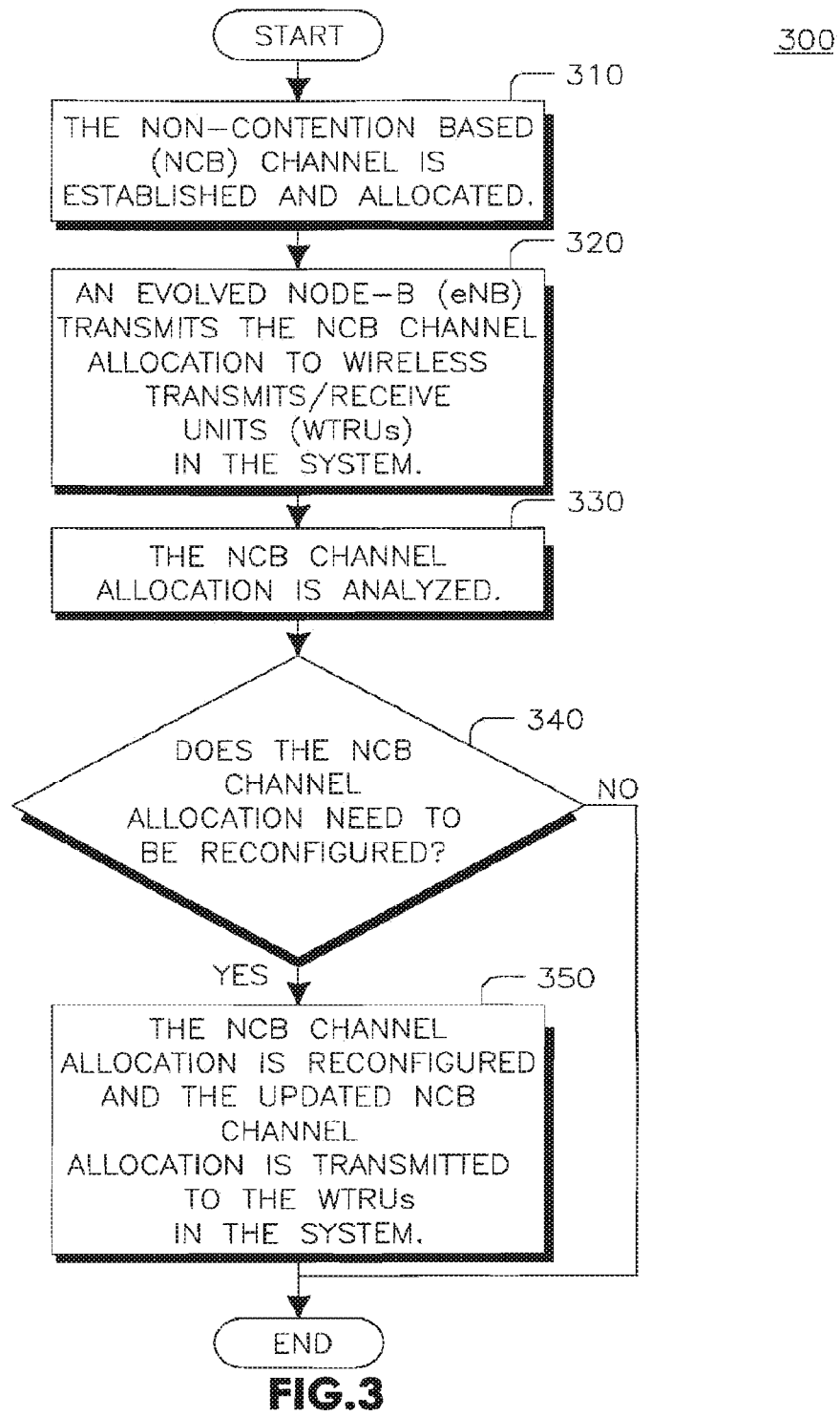
FIG. 3 is a flow diagram of a method for establishing and maintaining a non-contention based (NCB) channel with a particular WTRU, in accordance with the present invention.

FIG. 3 is a flow diagram of a method 300 for establishing and maintaining an NCB channel with a particular WTRU, in accordance with the present invention. In step 310, the NCB channel is established and allocated. The NCB channel may be configured by the eNB 110. For example, a network operator may identify certain radio resource management (RRM) parameters that are used by the eNB 110 to determine the NCB channel configuration and when it is established and reconfigured.

In the establishment of the NCB channel, the duration and periodicity of the channel may be configured. In a preferred embodiment, the duration may be infinite. Additionally, the system or WTRU 120 may have the ability to terminate or reconfigure the allocated NCB channel. In the infinite case, signaling from either the eNB 110 or the WTRU 120 may terminate the NCB channel allocation.

The NCB channel may be allocated to a particular WTRU 120 for a given duration. The duration may be a subset of time for the WTRU 120 to utilize the NCB channel or the WTRU 120 may be assigned a periodic interval for usage of the NCB channel. It should also be noted that any combination of the above allocations may be utilized, and the durations and/or periodic operation may include the physical resources allocated being time multiplexed among a plurality of WTRUs 120.

The wireless communication system 100 may utilize a number of characteristics in configuring the NCB channel. For example, the NCB channel may be configured to support functions such as timing advance, measurement reporting, UL physical resource requesting, providing information for DL resource scheduling, keep-alive heartbeat, hybrid automatic repeat request (HARQ) feedback and/or Medium Access Control (MAC) or Radio Resource Control (RRC) layer signaling, all of which are described herein following. Furthermore, the NCB channel may be configured to support a combination of functions. For example, a particular WTRU 120 performing a scheduling request may also be concurrently providing measurement reporting or concurrently providing a synchronization burst to perform timing advance. Accordingly, any combination of these functions may be performed in a common signaling procedure. Therefore, any number of functions may be performed concurrently on a configured NCB channel. In another embodiment, a periodic NCB channel may be configured following a predefined period during which no UL transmissions have been occurring.

Additionally, the service types such as Voice over IP (VoIP) or internet gaming, the Quality of Service (QoS) requirements for services currently active on the WTRU 120 may be utilized, as well as the activity rate of those services.

The configuration of the NCB channel may also include multiplexing it in the frequency domain, such as through frequency division multiplexing (FDM). The NCB channel may also be multiplexed in the code domain by using spreading codes, in the time domain, and in the space domain using spatial division multiplexing (SDMA) or other MIMO techniques. Furthermore, the NCB channel may be multiplexed by any combination of the above multiplexing techniques.

In this way, physical resources utilized by the NCB channel may be configured for use by more than one WTRU 120 at various times without being contended for by those WTRUs 120 during any particular period of time. For example, the NCB channel may be allocated to $WTRU_1$ for a particular periodicity and/or duration, and allocated to $WTRU_2$ for another periodicity and/or duration. Accordingly, the NCB channel is typically dedicated to a particular WTRU 120 at a particular moment in time, but shared among a plurality of WTRUs 120 over various periods in time.

Still referring to FIG. 3, the NCB channel allocation is transmitted to the WTRUs 120 in the wireless communication system 100 by the eNB 110 (step 320) with which the WTRUs 120 are in communication. In the example depicted in FIG. 1, $eNB_1$ transmits the NCB channel allocation to $WTRU_1$, $WTRU_2$, and $WTRU_3$, while $eNB_2$ transmits the NCB channel allocation to $WTRU_4$. This transmission, or communication, may be included in the downlink (DL) common control channel signaling or a dedicated control channel signal mapped to a DL shared channel among the WTRUs 120.

Alternatively, the NCB channel may be allocated by the DL common control channel as other uplink (UL) shared channel allocations. Additionally, where the NCB channel is a control channel separate from the UL shared channel used for user data transmissions, a logical control channel mapped to the DL shared channel may be utilized.

Figure 4:
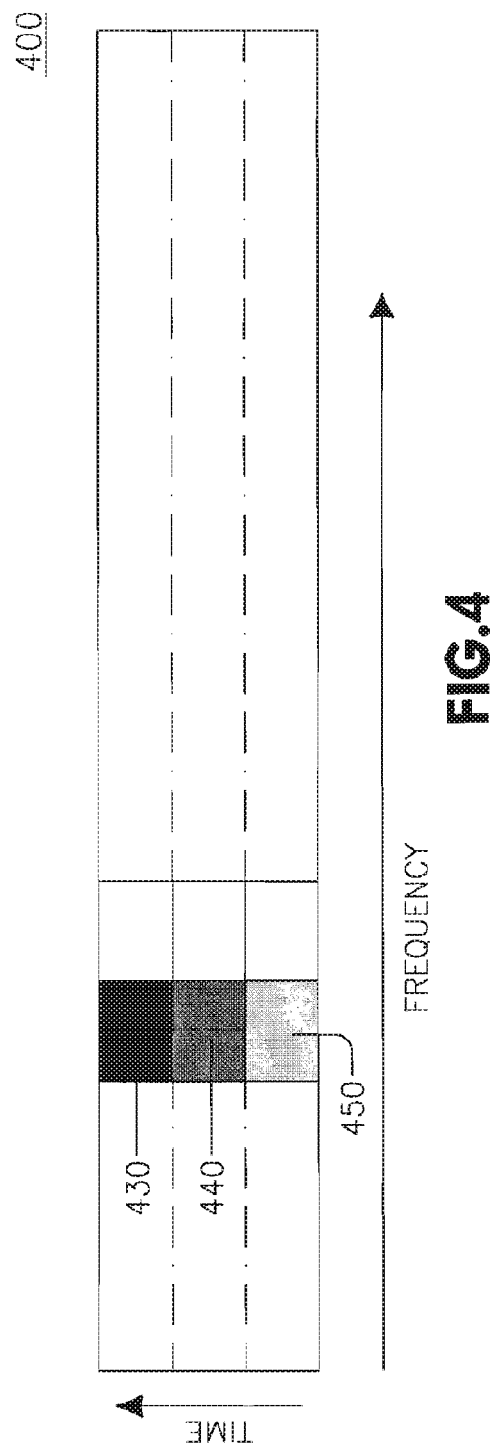
FIG. 4 is an exemplary time-frequency diagram depicting an NCB channel allocation to a plurality of WTRUs, in accordance with the present invention.

FIG. 4 is an exemplary time-frequency diagram 400 depicting an allocation of NCB channels (designated 430, 440, and 450) to a plurality of WTRUs 120, in accordance with an embodiment of the present invention. In particular, NCB channel 430 may be dedicated to $WTRU_1$, NCB channel 440 may be dedicated to $WTRU_2$, and NCB channel 450 may be dedicated to $WTRU_3$. Accordingly, in the present example, $WTRU_1$ accesses $eNB_1$ on NCB channel 430, $WTRU_2$ accesses $eNB_1$ on NCB channel 440, and $WTRU_3$ accesses $eNB_1$ on NCB channel 450, whereby the WTRUs 120 do not need to contend with one another for access to the eNB 110.

As shown in FIG. 3, the allocation of the NCB channel is analyzed by the wireless communication system 100 (step 330) to ensure an optimal allocation. For example, the wireless communication system 100 may analyze the amount of time the currently allocated NCB channel has remained idle, or the QoS requirements for the various WTRUs 120 in the system 100. Alternatively, the system 100 may determine that the NCB channel should be reconfigured upon reception of channel allocation signaling whereby data capacity may need to be increased or decreased. If the system 100 determines that a reconfiguration or reallocation is required based on the analysis (step 340), then the system 100 may reconfigure the allocation of the NCB channel, and transmit the updated NCB channel allocation to the WTRUs 120 in the system (step 350).

Figure 5:
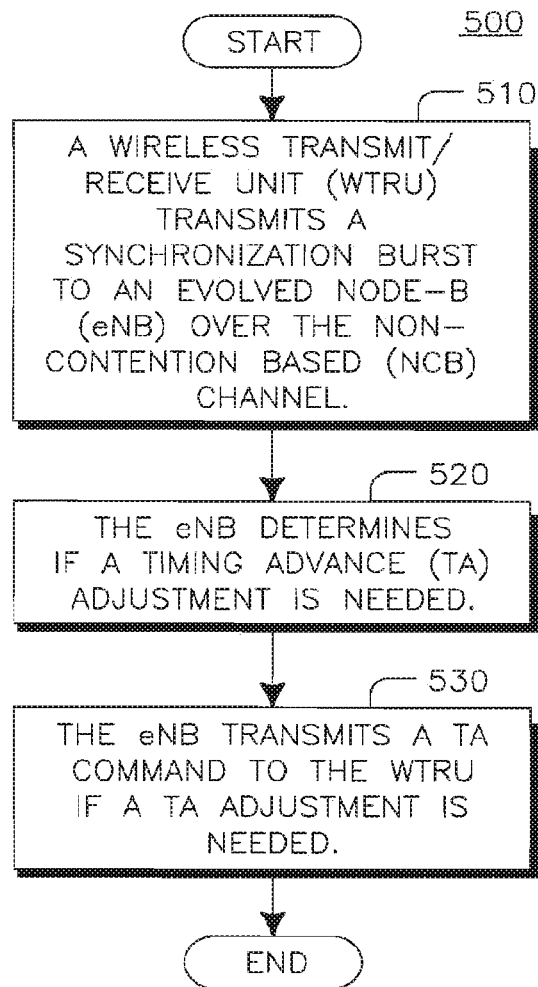
FIG. 5 is a flow diagram of a method for determining a timing advance using an NCB channel, in accordance with the present invention.

FIG. 5 is a flow diagram of a method 500 for determining a timing advance using an NCB channel, in accordance with the present invention. In step 510, the WTRU 120 transmits a synchronization burst to the eNB 110 over the NCB channel allocated to the WTRU 120. This synchronization burst may be transmitted periodically or dynamically based on specific triggering events. Since timing advance is relative to signal propagation delay and a maximum WTRU speed is known, a periodicity requirement of timing advance bursts can be calculated and matched with the configured periodicity of the NCB channel. Preferably, the synchronization bursts are coordinated with the time intervals that the NCB channel exists for that particular WTRU 120.

The eNB 110 receives the synchronization burst from the WTRU 120 and performs timing estimation to determine whether or not a timing advance (TA) adjustment is needed to maintain physical synchronization between the WTRU 120 and the eNB 110 (step 520). If a TA adjustment is needed (step 520), then the eNB transmits a TA command to the particular WTRU 120 (step 530). This TA command may be sent on the DL common control channel or on a control channel mapped to a DL shared channel assigned to the particular WTRU 120.

Since a periodic NCB channel may be configured following a predefined period during which no UL transmissions have been occurring, the NCB channel can be dynamically allocated, or established, during periods of UL inactivity to maintain synchronization. By maintaining synchronization during periods of inactivity with the NCB channel, transmission may be restarted with reduced latency which allows QoS requirements to be better maintained.

Figure 6:
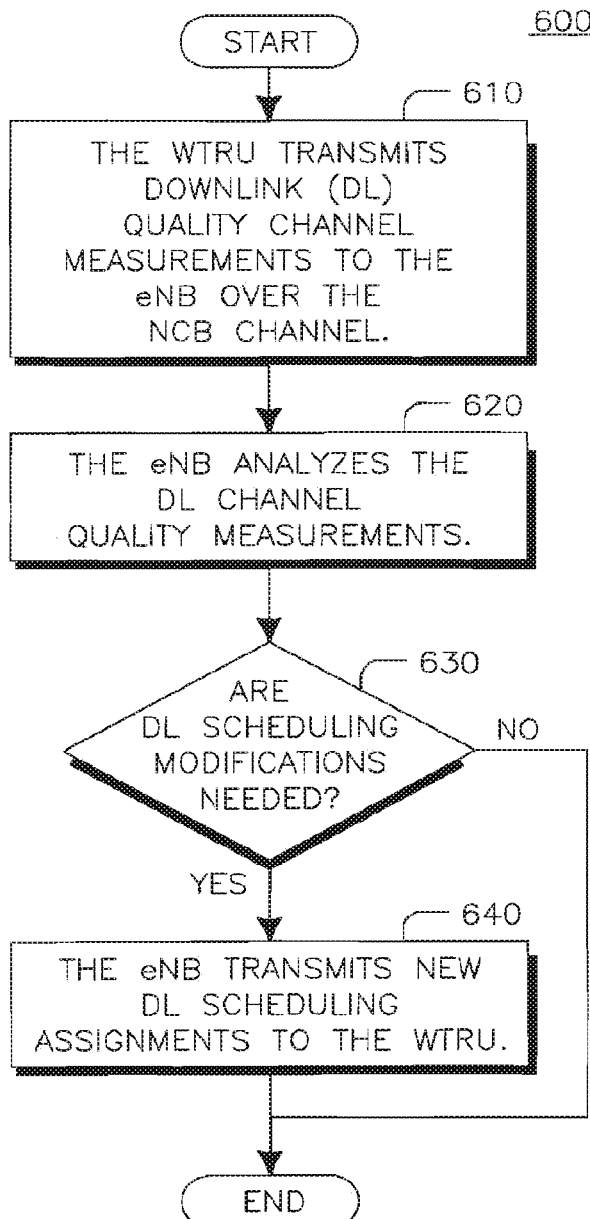
FIG. 6 is a flow diagram of a method for determining scheduling modifications using an NCB channel, in accordance with another embodiment of the present invention.

FIG. 6 is a flow diagram of a method 600 for determining DL scheduling modifications using an NCB channel, in accordance with another embodiment of the present invention. The WTRU 120 transmits a burst to the eNB 110 over the NCB channel reporting the DL channel quality measurements (step 610). When the eNB 110 receives the channel quality measurements, the eNB 110 analyzes them to determine whether or not modifications, or adjustments, to DL scheduling need to be made (step 620). DL channel quality measurements may be reported periodically or dynamically based on triggering events. Preferably, channel quality reporting coincides with the configured allocation of the NCB channel. Use of the NCB channel for WTRU measurement reporting provides a more efficient use of physical resources and provides UL information signaling with reduced latency compared to use of a RACH, or dynamically requesting a UL shared channel for this purpose. If a DL scheduling modification is needed (step 630), then the eNB 110 transmits the new DL channel scheduling assignments to the WTRU 120 (step 640).

In the embodiment shown in FIG. 6, the NCB channel may be periodically configured or event triggered for UL measurement reporting. Accordingly, as described above, this use of the NCB channel may coincide with other concurrent functions or uses of the NCB channel, such as timing advance, scheduling requests, measurement reporting and the like.

Figure 7:
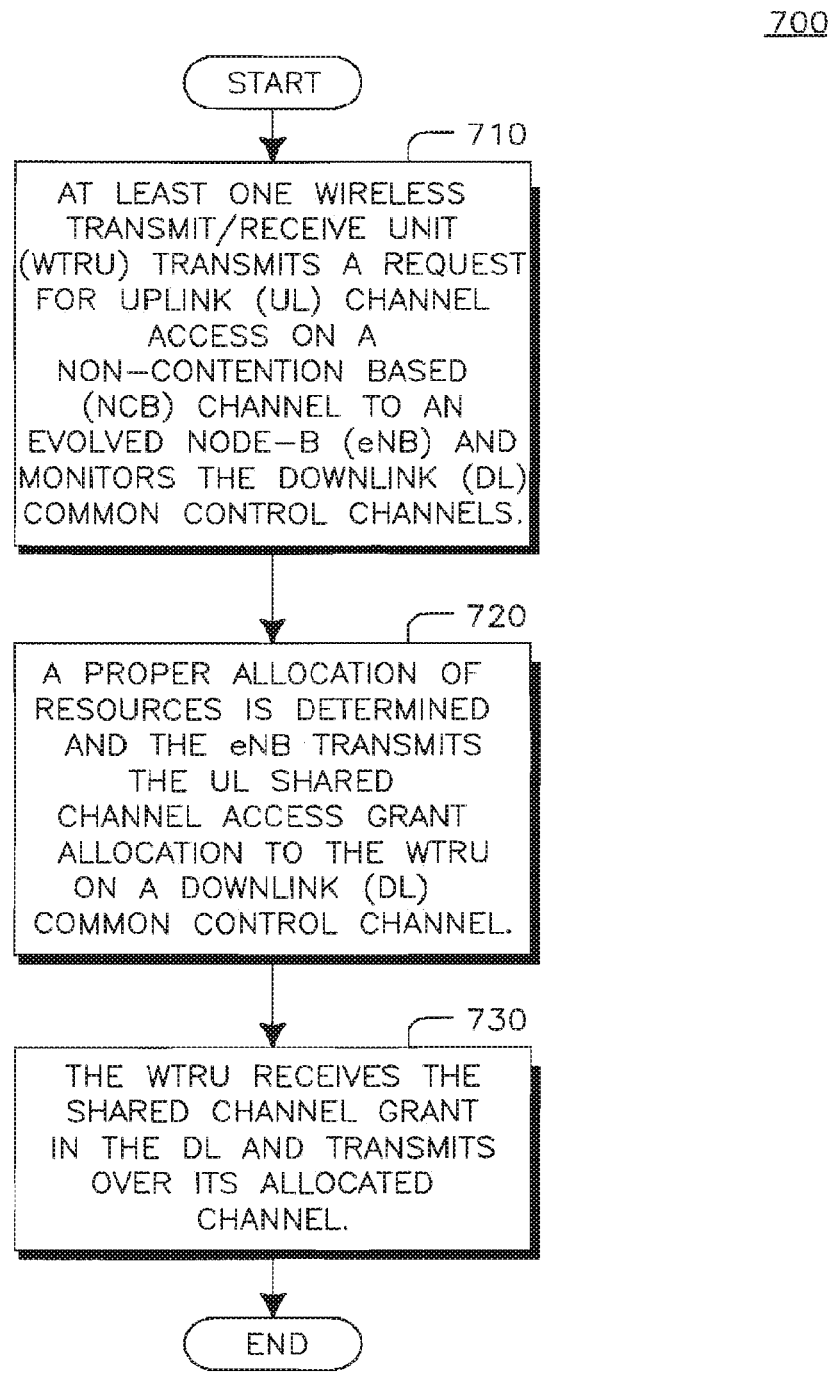
FIG. 7 is a flow diagram of a method of allocating resources using an NCB channel, in accordance with another embodiment of the present invention.

FIG. 7 is a flow diagram of a method 700 of requesting UL resources using an NCB channel, in accordance with another embodiment of the present invention. In step 710, one or more WTRUs 120 transmit a scheduling request for UL channel access on their dedicated NCB channel that has been configured and allocated for them. In the present embodiment, the NCB channel may be periodically configured or even triggered for support of scheduling requests. Additionally, the occurrence of scheduling requests may coincide with other NCB channel uses, such as timing advance, channel measurement reporting and the like.

Referring back again to FIG. 4, the transmitted request in step 710 of FIG. 7 may be a burst transmitted by one of the WTRUs 120 on its respective NCB channel (430, 440, or 450) requesting an allocation of UL physical resources whereby the presence of the burst itself is indicative of the resource allocation request for that particular WTRU 120. Alternatively, the burst may be an indication which, for example, may only include one bit of information, such as a "zero (0)" or a "one (1)" that indicates whether or not a resource allocation is needed. The burst may also include information related to the resource allocation request, such as the amount of UL data the particular WTRU 120 will need to transmit, the priority of the data, the QoS, latency requirement, BLER requirement and the like.

The NCB may be configured with periodic operation with or without a specified duration. Preferably, the UL channel allocation request will coincide with the periodic operation of the NCB channel. If an urgent UL resource request is required and an NCB is not available, the RACH may be used. The UL resource request method may coincide with the timing advance method 500, or measurement reporting method 600. In these cases the NCB channel provides multiple purposes in a common UL transmission.

Based on the UL resource request, a proper allocation of resources is determined and the eNB 110 transmits the UL shared access grant to the one or more WTRUs 120 on a DL common control channel (step 720), as shown in FIG. 7.

Figure 8:
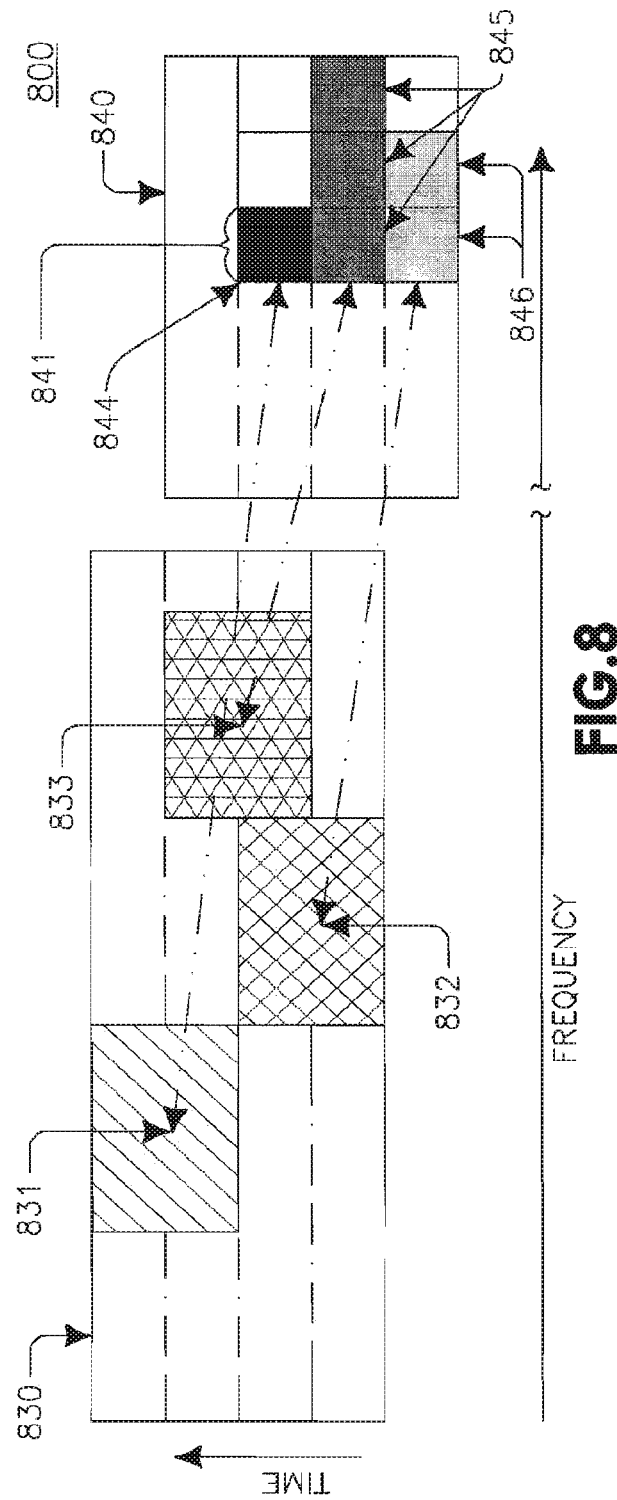
FIG. 8 is an exemplary time-frequency diagram depicting an allocation of resources, in accordance with the method of FIG. 6.

For purposes of example, FIG. 8 is an exemplary time-frequency diagram 800 depicting an allocation of physical resources, in accordance with step 720 of the method 700 of FIG. 7. FIG. 8 is a time-frequency diagram 800 that includes an allocated resources portion 830 and an allocated resource blocks portion 840. In the present example, the allocated resources portion 830 depicts a resource allocation for WTRU$_1$ (831), a resource allocation for WTRU$_2$ (832), and a resource allocation for WTRU$_3$ (833). In this manner, the resource allocation may be determined implicitly by the WTRUs 120 based on the resource utilized for the access grant in the DL transmission.

Alternatively, the resource allocations 831, 832, and 833 may correspond to allocated resource blocks in the allocated resource blocks portion 840. For example, referring again to FIG. 8, resource allocation 831 corresponds to a single resource block 844 allocated for WTRU$_1$. However, resource allocation 832 corresponds to three (3) resource blocks 845 that are allocated for WTRU$_2$, while resource allocation 833 corresponds to two (2) resource blocks 846 that are allocated for WTRU$_3$. It should be noted that the resource block allocation shown in FIG. 8 is exemplary and any particular resource allocation may correspond to a single resource block or to a plurality of resource blocks. An identifier (ID) for the particular WTRU 120 that is allocated a resource block may be included to identify to the WTRU 120 which resource block belongs to it. Alternatively, the DL control channel may be common to a plurality of WTRUs 120.

In any event, the resource allocation is identified to the WTRU 120 as to any period that the resource is allocated for that WTRU 120, as well as where that allocation exists. For example which resource blocks are allocated to a particular WTRU 120 is identified to the WTRU 120.

Once particular WTRUs 120 receive their shared channel access grants in the DL, the WTRUs 120 transmit over their allocated channels or resource blocks (step 730).

In yet another embodiment, the NCB channel may be utilized for keep-alive heartbeat. For example, the WTRU 120 transmits a periodic keep-alive signal over the NCB channel that is utilized by the system to detect a failure of the radio link between the WTRU 120 and the eNB 110. In this manner, the system can institute any action required to restore any lost connectivity with this particular WTRU 120 as well as recover any resources that are allocated to the WTRU 120. Additionally, as with various other NCB channel functions and uses, signaling for the keep-alive heartbeat may be combined with other NCB channel functions whose UL channel requirement coincides. For the purposes of a keep-alive signal a similar NCB channel may be allocated in the DL so that the WTRU may take proper actions required following a link failure.

In another embodiment, the NCB channel may be utilized for HARQ feedback. For example, in response to HARQ transmissions, the NCB channel may be utilized for transmission of positive (successful) or negative (unsuccessful) acknowledgements (ACKs). Additionally, the process number or any other HARQ parameters used to coordinate HARQ transmissions may be transmitted over the NCB channel, depending on the HARQ method. The NCB channel may be particularly useful in the case of synchronous HARQ operation where periodic feedback may be aligned with the periodic configuration of the NCB channel.

In another alternative embodiment, the NCB channel may be utilized for MAC signaling, RRC signaling and/or small amounts of user data. Additionally, coordination of the MAC and/or RRC layer operation may be achieved over the NCB channel. In these cases, procedures with known frequency may be mapped to the NCB channel to optimize the use of physical resources. The WTRUs 120 may also transmit small amounts of data on their allocated NCB channel. In this manner, the NCB channel may be used by WTRUs 120 to transmit small amounts of user data when shared channel or other alternate channel is not available/allocated. Allowing user data on the NCB channel reduces transmission latency and improves QoS.

In order to provide resilience against frequency selective fading, the UL NCB channels may comprise several sub-channels in an XFDMA system, such as an orthogonal frequency-division multiple-access (OFDMA) or single carrier (SC) FDMA system (SC-FDMA). In one subframe of an XFDMA system, there are short blocks (SB) and long blocks (LB). An SB is typically used to transmit the reference signals and an LB is typically used to transmit data packets. The reference signals provide a complete view of the channel layout in one OFDM subframe for a particular WTRU 120, and may also be utilized for channel measurements to determine the severity of the frequency selective fading. Accordingly, it can be used to determine how diverse in frequency the NCB channel allocation will need to be.

Figure 9:
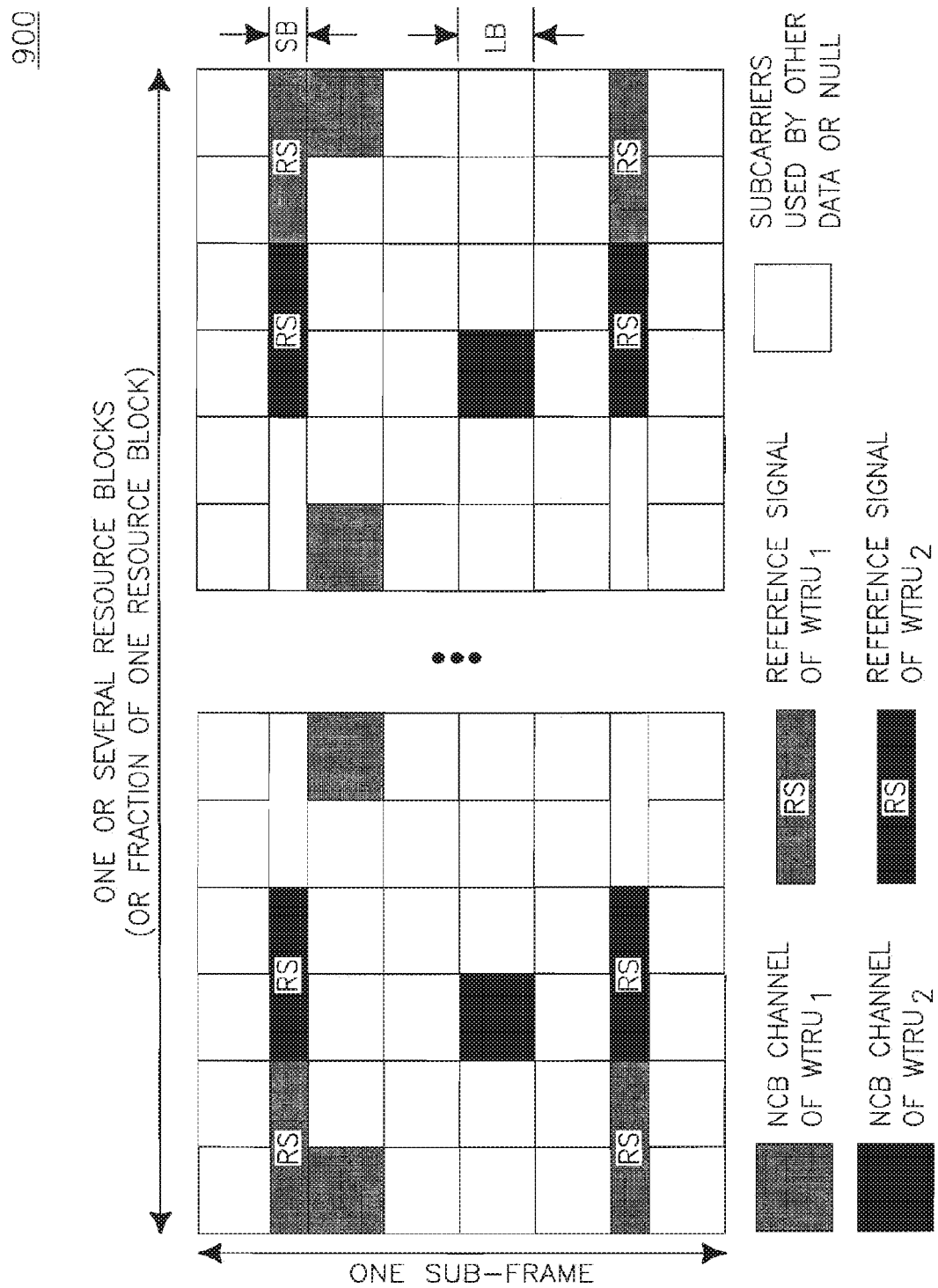
FIG. 9 is an exemplary block diagram depicting a frequency diverse NCB channel allocation in a system comprising a plurality of sub-channels in accordance with the present invention.

FIG. 9 is an exemplary block diagram 900 depicting a frequency diverse NCB channel allocation in a system comprising a plurality of sub-channels, in accordance with the present invention. For example, as depicted in FIG. 9, the NCB channel allocations for WTRU$_1$ and WTRU$_2$ are shown spread over a plurality of sub-channels that may exist in a single resource block or in a fraction of a resource block. Then the NCB channel is allocated in a distributed manner based on the UL channel measurements.

Further efficiency may be achieved in the utilization of the NCB channel where the resource is changed for a particular WTRU 120. For example, the NCB resource allocation may be changed according to a pre-configured time and/or frequency hopping pattern. An NCB channel with a very small amount of channel resources may not have good frequency diversity even if the NCB channel is spread as wide as possible in the frequency domain. Therefore, applying time and/or frequency hopping may further improve the diversity and ensure the NCB channel is received properly at a receiver side.

Figure 10:
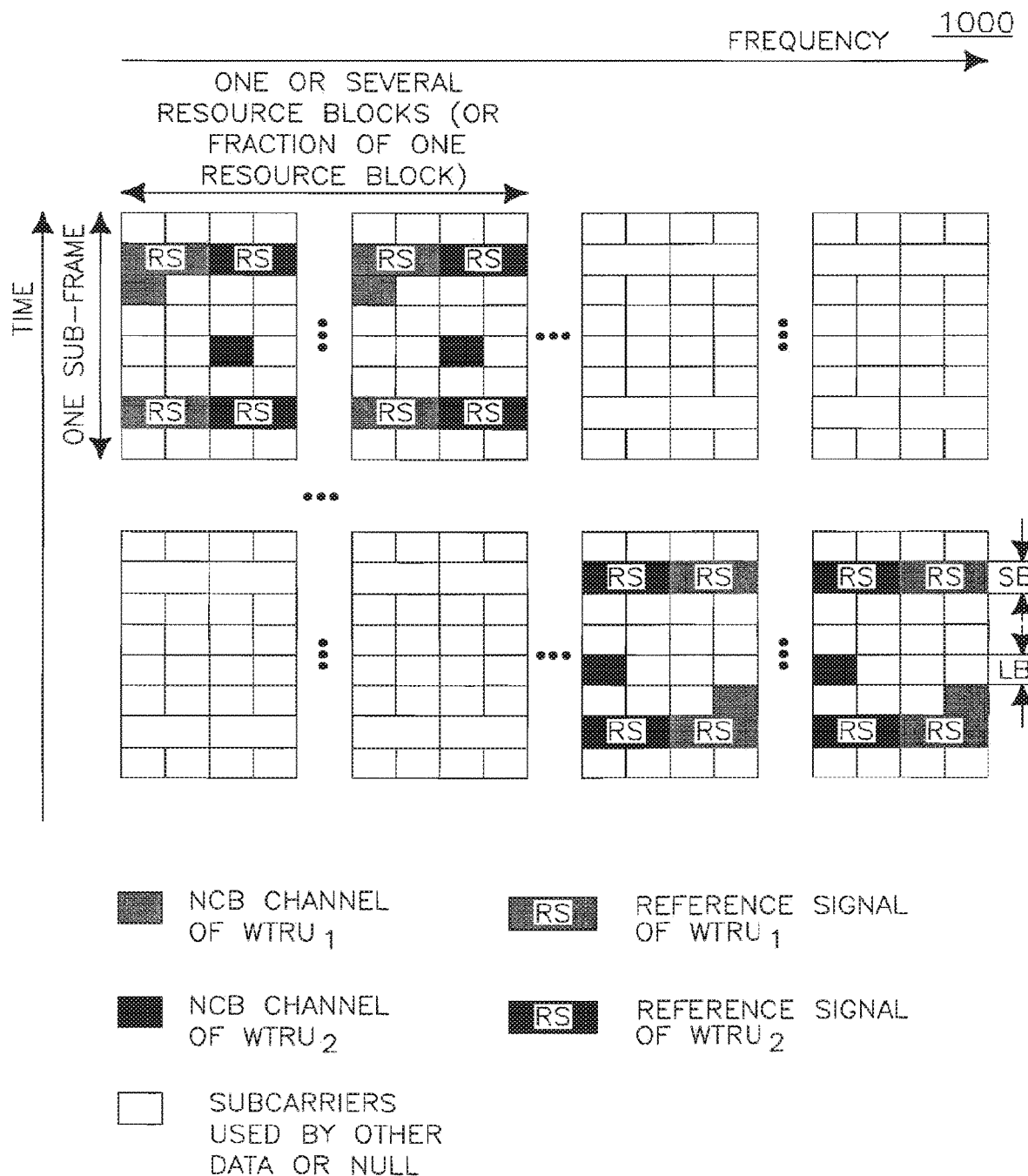
FIG. 10 is an exemplary time-frequency diagram depicting a time and frequency hopping NCB channel allocation, in accordance with an embodiment of the present invention.

FIG. 10 is an exemplary time-frequency diagram 1000 depicting a time and frequency hopping NCB channel allocation, in accordance with an embodiment of the present invention. In different subframes, where the resource is allocated to a particular WTRU 120, the frequency allocation of the resource for an NCB channel will change across subframes. This frequency allocation change is based on the hopping pattern in the time and/or frequency domain, which is pre-configured during the NCB allocation phase. This is another alternative embodiment for physical realization of the NCB channel. The frequency/timing hopping pattern is an important message when signaling NCB channel allocation for a particular WTRU 120 so that it can transmit using the NCB channel according to that hopping pattern. Likewise, the eNB 110 can receive signaling by following the same pattern in a coordinated way.

The NCB channel may be further configured by the eNB 110 transmitting control messages to the WTRU 120. For example, the eNB 110 may transmit a resource message relating to sub-carriers, space (antenna beams), slots, or codes. Additionally, the eNB 110 may transmit a hopping sequence, such as an index of a prescribed set of hopping sequences to the WTRU 120 to which the NCB channel is allocated.

In an additional embodiment, the NCB channel may be allocated along with both real time (RT) and non real time (NRT) services to assist dynamic, semi-dynamic, persistent or semi-persistent scheduling for the services.

For NRT services, the NCB channel may be allocated to support dynamic scheduling. For example, the NCB channel may be used for timing advance, periodic measurement reporting, UL physical resource requesting, UL traffic status reporting, providing information for DL resource scheduling, HARQ feedback and/or MAC/RRC layer signaling, and the like. The NCB channel supporting dynamic or semi-dynamic scheduling may be configured at the beginning of the dynamic or semi-dynamic scheduling of an NRT service for one WTRU, or in the middle of the scheduling. Also the NCB channel can be terminated, modified or extended as situations such as WTRU mobility or channel conditions change.

An NCB channel for some particular applications may have consistent periodicity from the beginning of the scheduling allocation of the NCB. Alternatively, the NCB channel for other particular applications may start its periodicity at a certain time after each bursty transmission.

For example, in the former case, timing advance and measurement reporting may require continuous reporting to support accurate scheduling decisions. However, a HARQ ACK/NAK feedback does not necessarily need to maintain its periodicity from the beginning of the scheduling, and the NCB channel can therefore start a certain time after one bursty transmission for several times unless successful reception is declared.

The duration of the NCB channel may be terminated before its allocated life cycle expires or be extended based on system demand. Termination of an existing NCB may be signaled through an indication from the eNB 110 via an RRC message, MAC signaling (such as a MAC header) or layer 1 or layer 2 (L1/L2) signaling. In one example, the indication can simply be an "OFF (0)" signal.

The termination of the NCB channel allocation can be explicitly or implicitly signaled. For example, at the end of voice silent period, the WTRU 120 sends a voice activity change indication to eNB 110 over the NCB channel. The eNB 110 then allocates new persistent UL radio resources for voice activity over the DL scheduling channel. Upon receiving the UL resource allocation on the DL scheduling channel, the WTRU 120 may implicitly detect the termination of existing NCB channel allocations. Alternatively, one explicit indication can be sent from the eNB 110 to the WTRU 120 to signal the termination.

An extension of the NCB channel may be for a substantially same duration as a previous allocation or for a different duration, either longer or shorter. The extension may also include a configuration of new time and frequency allocation patterns, such as frequency hopping.

The periodicity of the NCB channel may be determined based on the application of the NCB channel. For example, in a WTRU high mobility scenario, a high periodicity NCB channel should be allocated to support UL timing maintenance. How often measurement reports should be sent to the eNB 110 are also determined based on the application of the NCB channel.

Figure 11:
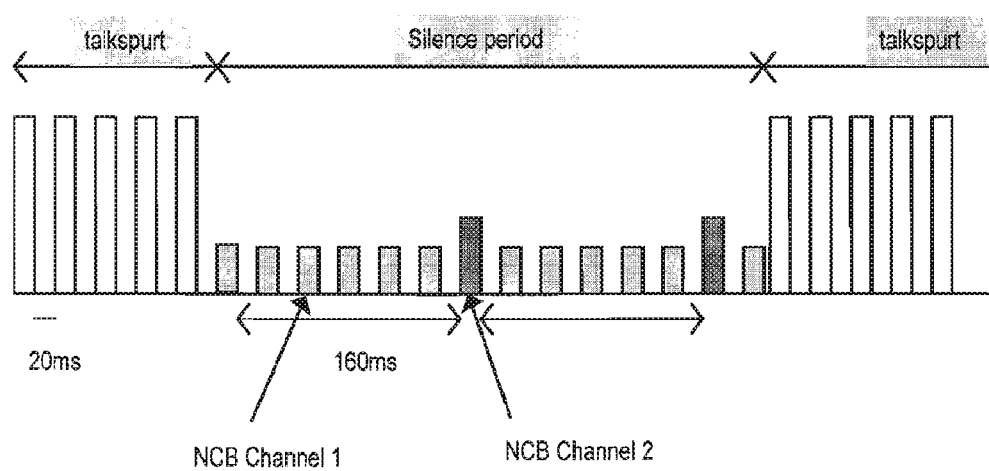
FIG. 11 is an exemplary diagram depicting differing NCB channel requirements for a WTRU, in accordance with an embodiment of the present invention.

FIG. 11 is an exemplary diagram depicting differing NCB channel requirements for a WTRU, in accordance with an embodiment of the present invention. Referring to FIG. 11, more than one NCB channel may be allocated simultaneously to a particular WTRU 120 for different scheduling purposes. These different NCB channels may have different configurations. For example, among other things, NCB channel periodicity and channel capacity may be configured to meet different requirements.

In a voice silent period, there may be NCB channels used to maintain UL timing, to send voice activity reports, to send measurement reports, to send UL scheduling requests and to send voice silence indication detections (SIDs), and the like to eNB 110. However, the periodicity for SID packets in the UL is every 160 milliseconds (ms), which may be different from the periodicity required for other functions. For example, the periodicity for a UL timing advance function may be either shorter or longer than the periodicity for sending SIDs. Also, radio resources used for SID packets and other UL utility purposes are different, which again requires different NCB channel configurations. Accordingly, different NCB channel configurations and allocations for different system requirements may be required. On the other hand, applications with similar resource and periodicity requirements may be grouped into one NCB channel configuration and allocation.

Additionally, there may be different application requirements for one WTRU where an NCB channel with one periodicity is allocated. In this case, the NCB channel may be configured with different radio resource allocations for different intervals within one NCB allocation. For example, a SID packet interval may coincide with other UL functions such as a UL scheduling request, timing maintenance and measurement reporting, and the like, for example every 160 ms. However, if at 160 ms intervals there are more radio resources needed to accommodate extra SID packet needs, the eNB 110 may allocate more radio resources at 160 ms intervals, and less resources at non-160 ms intervals. In doing so, the eNB 110 does not need to always allocate the maximum radio resources for all the NCB channel intervals to accommodate all different scenarios, thereby making resource utilization much more efficient.

Additionally, the NCB channel should be maintained during handovers from one base station to another. To this end, a source base station exchanges signaling with a target base station to allocate the NCB channel for the WTRU 120 in the target cell to which the WTRU is being handed over. This may be accomplished by transmission via a common control channel in the source cell or a shared channel allocated to a particular WTRU 120 to convey target cell NCB channel information to the particular WTRU 120. The information may include NCB channel resources in the target cell, hopping patterns in the target cell, or the timing advance, such as the timing difference between the source and target cells. The timing difference between cells in this case may be computed by the system and transmitted to the WTRU 120 about to be handed over by the source or target base station.

The present invention may be implemented in any type of wireless communication system, as desired. By way of example, the present invention may be implemented in any type of 802 type system, XFDMA, SC-FDMA, OFDMA, E-UTRA, LTE or any other type of wireless communication system.

Additionally, the features of the present invention may be implemented by software, may be incorporated into an integrated circuit (IC) or be configured in a circuit comprising a multitude of interconnecting components. Additionally, the processors 115/125 of the eNB 110 and WTRU 120, respectively, may be configured to perform the steps of any of the methods described above. The processors 115/125 may also utilize the receivers 116/126, transmitters 117/127, and antennas 118/128, respectively, to facilitate wirelessly receiving and transmitting data.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for in use in a wireless transmit receive unit (WTRU), user equipment, terminal, base station, radio network controller, or any host computer. The WTRU may be used in conjunction with modules, implemented in hardware and/or software, such as a camera, a video camera module, a videophone, a speakerphone, a vibration device, a speaker, a microphone, a television transceiver, a handsfree headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented by wireless transmit/receive unit (WTRU) for obtaining low latency access to an uplink shared channel, the method comprising:

receiving a control message that provides a non-contention based (NCB) uplink control channel allocation, wherein the control message indicates a periodicity, sub-carrier resources, and code information associated with NCB uplink control channel resources allocated to the WTRU for transmitting requests for uplink shared channel resources;

transmitting a burst on the NCB uplink control channel resources, wherein presence of the burst on the NCB uplink control channel resources corresponding to the NCB uplink control channel allocation indicates that the WTRU is requesting uplink shared channel resources, wherein hybrid automatic repeat request (HARQ) feedback coincides with the burst transmitted on the NCB uplink control channel resources;

monitoring a downlink control channel based on transmitting the burst;

receiving a transmission associated with a WTRU identifier on the downlink control channel, wherein the transmission on the downlink control channel comprises an uplink shared channel grant; and transmitting data on the uplink shared channel in accordance with the uplink shared channel grant.

2. The method of claim 1, further comprising requesting uplink shared channel resources using a random access channel (RACH) after the NCB uplink control channel allocation has been released.

3. The method of claim 1, further comprising receiving a second NCB uplink control channel allocation, wherein the second NCB uplink control channel allocation indicates a second periodicity, second sub-carrier resources, and second code information associated with second NCB uplink control channel resources allocated to the WTRU for transmitting channel quality information.

4. The method of claim 1, wherein the HARQ feedback is synchronous HARQ feedback.

5. The method of claim 1, wherein resource blocks corresponding to the NCB uplink control channel and resource blocks corresponding to the uplink shared channel are multiplexed in a single carrier frequency division multiple access (SC-FDMA) communication system.

6. The method of claim 1, wherein the allocation of the NCB uplink control channel is provided to the WTRU to support one or more active services being utilized by the WTRU.

7. The method of claim 6, wherein the active services comprises one or more of an active real time service or an active non-real time service.

8. The method of claim 1, wherein the code information comprises spreading code information.

9. A method implemented by wireless transmit/receive unit (WTRU), the method comprising:

receiving a control message that provides a non-contention based (NCB) uplink control channel allocation, wherein the control message indicates a periodicity, sub-carrier resources, and code information associated with NCB uplink control channel resources allocated to the WTRU for transmitting requests for uplink shared channel resources;

transmitting a burst on the NCB uplink control channel resources, wherein presence of the burst on the NCB uplink control channel resources corresponding to the NCB uplink control channel allocation indicates that the WTRU is requesting uplink shared channel resources, wherein hybrid automatic repeat request (HARQ) feedback is transmitted on the NCB uplink control channel resources via the burst;

monitoring a downlink control channel based on transmitting the burst;

receiving an uplink shared channel grant on the downlink control channel after transmitting the burst on the NCB uplink control channel resources, the uplink shared channel grant indicating uplink shared channel resource blocks that have been allocated to the WTRU for uplink data transmission; and transmitting the uplink data on the uplink shared channel resource blocks in accordance with the uplink shared channel grant.

10. A wireless transmit/receive unit (WTRU) comprising a processor configured to:

receive a control message that provides a non-contention based (NCB) uplink control channel allocation, wherein the control message indicates a periodicity, sub-carrier resources, and code information associated with NCB uplink control channel resources allocated to the WTRU for transmitting requests for uplink shared channel resources;

transmit a burst on the NCB uplink control channel resources, wherein presence of the burst on the NCB uplink control channel resources corresponding to the NCB uplink control channel allocation indicates that the WTRU is requesting uplink shared channel resources, wherein hybrid automatic repeat request (HARQ) feedback is transmitted on the NCB uplink control channel resources via the burst;

monitor a downlink control channel based on transmitting the burst;

receive an uplink shared channel grant on the downlink control channel after transmitting the burst on the NCB uplink control channel resources, the uplink shared channel grant indicating uplink shared channel resource blocks that have been allocated to the WTRU for uplink data transmission; and transmit the uplink data on the uplink shared channel resource blocks in accordance with the uplink shared channel grant.

11. The method of claim 9, wherein a WTRU identifier is used to indicate to the WTRU that the uplink shared channel grant is intended for the WTRU.

12. The method of claim 9, further comprising requesting uplink shared channel resources using a random access channel (RACH) after the NCB uplink control channel allocation has been released.

13. The method of claim 9, further comprising receiving a second control message that provides a second NCB uplink control channel allocation, wherein the second control message indicates a second periodicity, second sub-carrier resources, and second code information associated with second NCB uplink control channel resources allocated to the WTRU for transmitting channel quality information.

14. The method of claim 9, wherein the HARQ feedback is synchronous HARQ feedback.

15. The method of claim 9, wherein resource blocks corresponding to the NCB uplink control channel and resource blocks corresponding to the uplink shared channel are multiplexed in a single carrier frequency division multiple access (SC-FDMA) communication system.

16. The method of claim 9, wherein the NCB uplink control channel resources are associated with a frequency hopping pattern.

17. The WTRU of claim 10, wherein a WTRU identifier is used to indicate to the WTRU that the uplink shared channel grant is intended for the WTRU.

18. The WTRU of claim 10, wherein the processor is further configured to request uplink shared channel resources using a random access channel (RACH) after the NCB uplink control channel allocation has been released.

19. The WTRU of claim 10, wherein the processor is configured to receive a second control message that provides a second NCB uplink control channel allocation, wherein the second control message indicates a second periodicity, second sub-carrier resources, and second code information associated with second NCB uplink control channel resources allocated to the WTRU for transmitting channel quality information.

20. The WTRU of claim 10, wherein the HARQ feedback is synchronous HARQ feedback.

21. The WTRU of claim 10, wherein the NCB uplink control channel resources and the uplink shared channel resource blocks are multiplexed in a single carrier frequency division multiple access (SC-FDMA) communication system.

22. The WTRU of claim 10, wherein the NCB uplink control channel resources are associated with a frequency hopping pattern.

* * * * *